United States Patent
Hirose

(10) Patent No.: US 10,725,986 B2
(45) Date of Patent: Jul. 28, 2020

(54) APPARATUS FOR DATA LOADING AND DATA LOADING METHOD

(71) Applicant: FUJITSU LIMITED, Kawasaki-shi, Kanagawa (JP)

(72) Inventor: Atsuhito Hirose, Odawara (JP)

(73) Assignee: FUJITSU LIMITED, Kawasaki (JP)

( * ) Notice: Subject to any disclaimer, the term of this patent is extended or adjusted under 35 U.S.C. 154(b) by 355 days.

(21) Appl. No.: 15/835,506

(22) Filed: Dec. 8, 2017

(65) Prior Publication Data

US 2018/0181602 A1 Jun. 28, 2018

(30) Foreign Application Priority Data

Dec. 27, 2016 (JP) .................. 2016-253557

(51) Int. Cl.
  *G06F 16/00* (2019.01)
  *G06F 16/22* (2019.01)
  *G06F 16/28* (2019.01)

(52) U.S. Cl.
  CPC ........ *G06F 16/221* (2019.01); *G06F 16/2272* (2019.01); *G06F 16/285* (2019.01)

(58) Field of Classification Search
  None
  See application file for complete search history.

(56) References Cited

U.S. PATENT DOCUMENTS

| | | | | |
|---|---|---|---|---|
| 2011/0246550 A1* | 10/2011 | Levari | ............... | G06F 16/24556 709/201 |
| 2011/0314027 A1* | 12/2011 | Xu | ......... | G06F 16/221 707/743 |
| 2015/0193491 A1* | 7/2015 | Yang | ................. | G06F 16/2228 707/741 |
| 2016/0335317 A1* | 11/2016 | Teodorescu | ......... | G06F 11/1464 |

FOREIGN PATENT DOCUMENTS

| | | |
|---|---|---|
| JP | 60-196878 | 10/1985 |
| JP | 4-264973 | 9/1992 |
| JP | 2012-123680 | 6/2012 |

* cited by examiner

*Primary Examiner* — Bai D Vu
(74) *Attorney, Agent, or Firm* — Xsensus LLP

(57) ABSTRACT

An apparatus for data loading includes a memory and a processor coupled to the memory and the processor configured to, execute first acquisition of first data corresponding to a first column from a data group stored in a first storage, a data structure of the data group including columns and rows, store the first data into a second storage, and generate a first index based on the first data for searching the data group to be stored in the second storage in response to the first acquisition before completion of storing the data group into the second storage.

16 Claims, 30 Drawing Sheets

FIG. 13A

```
CREATE TABLE "EMPLOYEE TABLE" (
  "EMPLOYEE NUMBER"      INTEGER NOT NULL ,
  "NAME"                 CHAR(50) NOT NULL ,
  "AGE"                  INTEGER NOT NULL ,
  "DEPARTMENT CODE"      INTEGER NOT NULL ,
  "DEPARTMENT NAME"      CHAR(50) NOT NULL ,
  "POSITION"             CHAR(50) NOT NULL ,
  "POSITION JOINED DATE" DATE NOD NULL ) ;
```

FIG. 13B

```
CREATE INDEX "EMPLOYEE INDEX 1"
 ON "EMPLOYEE TABLE" (
 "DEPARTMENT CODE" , "POSITION" ) ;
```

FIG. 14

| EMPLOYEE NUMBER | NAME | AGE | DEPARTMENT CODE | DEPARTMENT NAME | POSITION | POSITION JOINED DATE |
|---|---|---|---|---|---|---|
| 1023 | ICHIRO TANAKA | 55 | 103 | THIRD DEVELOPMENT DEPARTMENT | MANAGER | 1985/4/1 |
| 1532 | JIRO SATOH | 38 | 103 | THIRD DEVELOPMENT DEPARTMENT | CHIEF | 2000/4/1 |
| 2143 | SABURO YAMADA | 29 | 201 | FIRST SALES DEPARTMENT | REGULAR | 2013/10/1 |
| 1934 | HANAKO SUZUKI | 42 | 103 | THIRD DEVELOPMENT DEPARTMENT | CHIEF | 2005/6/1 |
| ... | ... | ... | ... | ... | ... | ... |

FIG. 15

```
CREATE INDEX "EMPLOYEE TABLE INDEX 1"
 ON "EMPLOYEE TABLE" (
 "DEPARTMENT CODE" , "POSITION" ) ;

CREATE INDEX "EMPLOYEE TABLE INDEX 2"
 ON "EMPLOYEE TABLE" (
 "EMPLOYEE NUMBER" ) ;
```

FIG. 16

| EMPLOYEE NUMBER | NAME | AGE | DEPARTMENT CODE | DEPARTMENT NAME | POSITION | POSITION JOINED DATE |
|---|---|---|---|---|---|---|
| - | - | - | 103 | - | MANAGER | - |
| - | - | - | 103 | - | CHIEF | - |
| - | - | - | 201 | - | REGULAR | - |
| - | - | - | 103 | - | CHIEF | - |
| - | - | - | ... | - | ... | - |

FIG. 17

| EMPLOYEE NUMBER | NAME | AGE | DEPARTMENT CODE | DEPARTMENT NAME | POSITION | POSITION JOINED DATE |
|---|---|---|---|---|---|---|
| 1023 | — | — | — | — | — | — |
| 1532 | — | — | — | — | — | — |
| 2143 | — | — | — | — | — | — |
| 1934 | — | — | — | — | — | — |
| ... | | | | | | |

FIG. 18

| EMPLOYEE NUMBER | NAME | AGE | DEPARTMENT CODE | DEPARTMENT NAME | POSITION | POSITION JOINED DATE |
|---|---|---|---|---|---|---|
| 1023 | — | — | 103 | — | MANAGER | — |
| 1532 | — | — | 103 | — | CHIEF | — |
| 2143 | — | — | 201 | — | REGULAR | — |
| 1934 | — | — | 103 | — | CHIEF | — |
| … | | | | | … | |

APPARATUS FOR DATA LOADING AND DATA LOADING METHOD

CROSS-REFERENCE TO RELATED APPLICATION

This application is based upon and claims the benefit of priority of the prior Japanese Patent Application No. 2016-253557, filed on Dec. 27, 2016, the entire contents of which are incorporated herein by reference.

FIELD

The present embodiment relates to technology for data loading.

BACKGROUND

For example, in order to provide various services to users, a business person who provides services to users (in the following description, such business person is also referred to as business person simply) constructs and operates a business system according to an application.

Such a business system as just described is configured, for example, from an online system that performs an online process for providing a service to users and a batch system that performs a batch process after service time to users ends (for example, at night). In this case, the business system performs, for example, deactivation of the online system and activation of the batch system after the service time to users ends. Then, after the batch process by the batch system ends, the business system performs, for example, deactivation of the batch system and activation of the online system. Consequently, the business person may effectively utilize resources of the business system.

Further, in such a business system as described above, the online system is deactivated, for example, when maintenance such as table definition change such as column addition involved in change of business requirements or, updating of software configuring the business system or exchange of hardware is conducted. Then, the business system performs activation of the online system after the maintenance ends.

A technology related to such a business system described above is disclosed, for example, in Japanese Laid-Open Patent Application No. 04-264973, Japanese Laid-Open Patent Application No. 2012-123680 or Japanese Laid-Open Patent Application No. 60-196878.

SUMMARY

According to an aspect of the embodiments, an apparatus for data loading includes a memory and a processor coupled to the memory and the processor configured to, execute first acquisition of first data corresponding to a first column from a data group stored in a first storage, a data structure of the data group including columns and rows, store the first data into a second storage, and generate a first index based on the first data for searching the data group to be stored in the second storage in response to the first acquisition before completion of storing the data group into the second storage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 13A and 13B are views illustrating a particular example of table definition information and index definition information, respectively;

FIG. 14 is a view illustrating a particular example of an employee table after target data is stored;

FIG. 15 is a view illustrating a particular example of index definition information;

FIGS. 16 to 18 are views illustrating a particular example of processes at S24 and S25 of FIG. 8, respectively;

DESCRIPTION OF EMBODIMENTS

An online system includes, as components, not only a database management system (DBMS) for efficiently managing large scale data but also a key value store (KVS), an in-memory database (IMDB) or the like for performing a process for data managed by the DBMS at a high speed. In such an online system, upon activation, storage of data into the DBMS, KVS or IMDB (hereinafter referred to also as DBMS or the like simply), creation of an index that is used to perform search of data stored in the DBMS or the like at a high speed or the like is sometimes performed.

Here, for example, if the number of users who utilize services increases, the amount of data that is to be stored into the DBMS or the like increases. In this case, the period of time required for storage of data into the DBMS or the like or for creation of indexes increases together with increase of the amount of data that are to be stored into the DBMS or the like. Therefore, for example, if the number of users who utilize services exceeds an estimate upon construction of the business system, there is the possibility that activation of the online system may not be completed before starting time of a service.

[Configuration of Online System]

Figure 1:
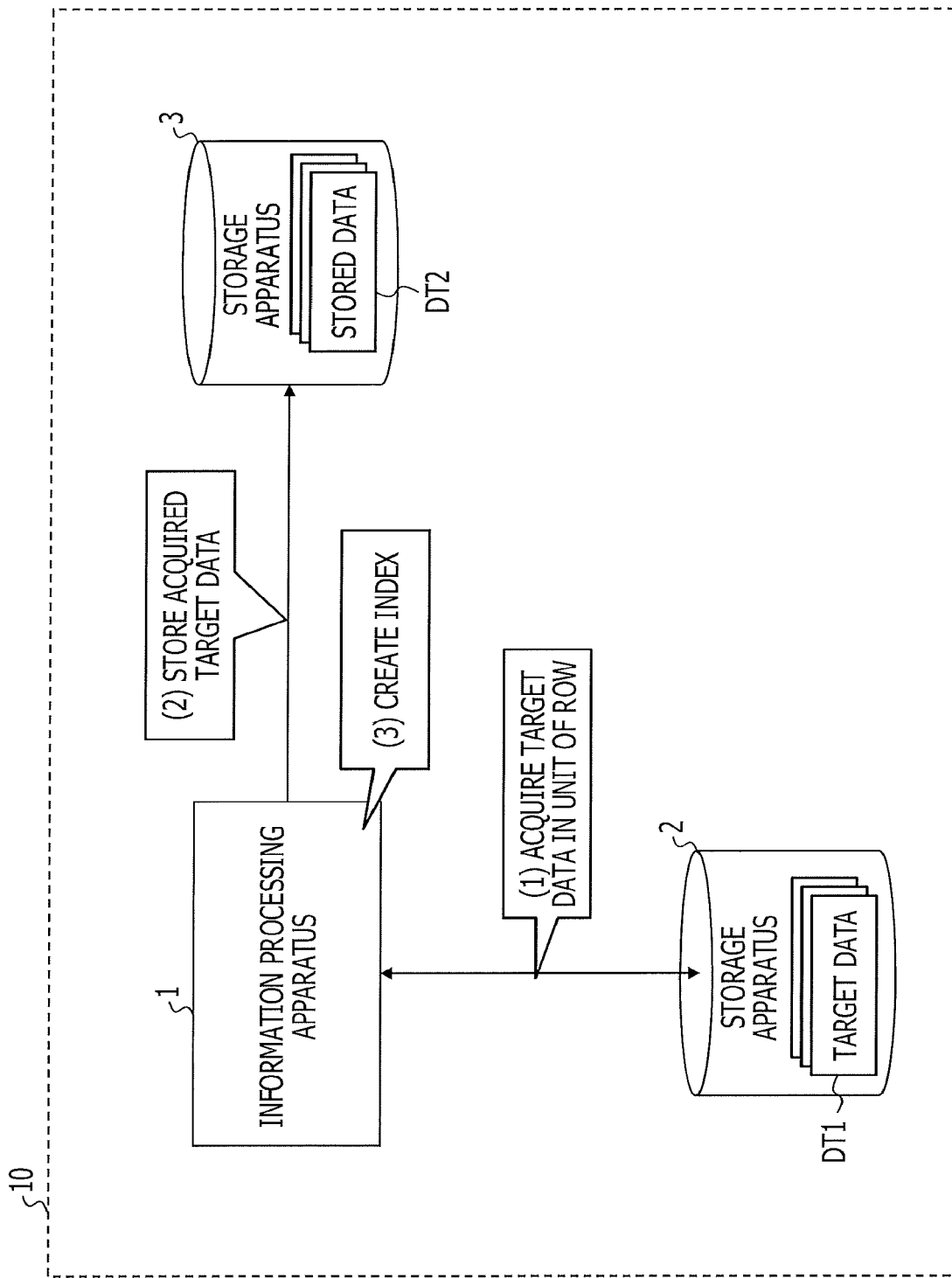
FIG. 1 is a view depicting a configuration of an online system.

First, a configuration of an online system 10 is described. FIG. 1 is a view depicting a configuration of an online system.

The online system 10 (hereinafter referred to also as information processing system 10) includes an information processing apparatus 1, a storage apparatus 2 and another storage apparatus 3. Although the present embodiment is described assuming that the storage apparatus 2 is an apparatus different from the information processing apparatus 1, the storage apparatus 2 may be configured from part of the information processing apparatus 1. Similarly, although the present embodiment is described assuming that the storage apparatus 3 is an apparatus different from the information processing apparatus 1, the storage apparatus 3 may be configured from part of the information processing apparatus 1 (for example, a memory of the information processing apparatus 1).

In the storage apparatus 2, for example, load target data DT1 (hereinafter referred to also as target data DT1 or data group DT1 simply) that is stored into the storage apparatus 3 upon activation of the online system 10 is stored. The load target data DT1 has a data structure configured from rows and columns and is stored, for example, in the form of a comma separated values (CSV) file in the storage apparatus 1.

The information processing apparatus 1 stores the target data DT1 stored in the storage apparatus 2 into the storage apparatus 3, for example, in response to that time at which the online system 10 is to be activated comes.

For example, the information processing apparatus 1 acquires the target data DT1 from the storage apparatus 2 in a unit of a column ((1) of FIG. 1). Then, the information processing apparatus 1 stores the acquired target data DT1 of a column unit into the storage apparatus ((2) of FIG. 1). Data stored in the storage apparatus 3 is hereinafter referred to also as stored data DT2.

Thereafter, the information processing apparatus 1 creates, based on the stored data DT2 stored in the storage apparatus 3, an index for searching each data included in the stored data DT2 at a high speed ((3) of FIG. 1). For example, the information processing apparatus 1 acquires data corresponding to a column or columns to be used for creation of an index from within the stored data DT2 stored in the storage apparatus 3 and creates an index from the acquired data.

Here, for example, if the number of users who utilize a service provided by a business system including the online system 10 increases, the amount of data that is to be stored into the storage apparatus 3 increases. In this case, the time period required for storage of data into the storage apparatus 3, creation of an index or the like increases. Therefore, there is the possibility that the online system 10 may not be activated in time for the start time of a service due to variation of a situation in terms of the number of users who utilize the service or the like.

Therefore, the information processing apparatus 1 in the present embodiment acquires each data included in the target data DT1 stored in the storage apparatus 2 in order and stores the acquired data into the storage apparatus 3 prioritizing data corresponding to a column or columns to be used for creation of an index to the target data DT1 (such data is hereinafter referred to also as creation source data). Then, the information processing apparatus 1 creates an index from the stored creation source data in response to that the creation source data is stored into the storage apparatus 3.

For example, the information processing apparatus 1 stores creation source data to be used for creation of an index from within the data included in the target data DT1 into the storage apparatus 3 preferentially to the other data. For example, the information processing apparatus 1 acquires and stores creation source data corresponding to a column or columns to be used for creation of an index in a unit of a column into the storage apparatus 3. Then, when the storage of creation source data to be used for creation of a certain index into the storage apparatus 3 is completed, the information processing apparatus 1 starts creation of an index with regard to which the storage of the original creation data is completed without waiting for completion of storage of all data included in the target data DT1.

In this regard, where acquisition and storage of data included in the target data DT1 are performed in a unit of a row, the information processing apparatus 1 may complete storage of creation source data required for creation of an index only after storage of all data included in the target data DT1 is completed. Therefore, the information processing apparatus 1 in this case fails to perform creation of an index precedently to completion of storage of all data included in the target data DT1. Accordingly, if creation source data to be used for creation of an index is acquired in a unit of a column and stored into the storage apparatus 3, the information processing apparatus 1 may perform creation of an index precedently to completion of storage of all data included in the target data DT1.

Consequently, the information processing apparatus 1 may reduce the period of time required for storage of data included in the target data DT1 and creation of an index. Therefore, even where there is a restriction on the activation time of the online system 10, the information processing apparatus 1 may increase the probability that the restriction may be satisfied.

[Hardware Configuration of Information Processing System]

Figure 2:
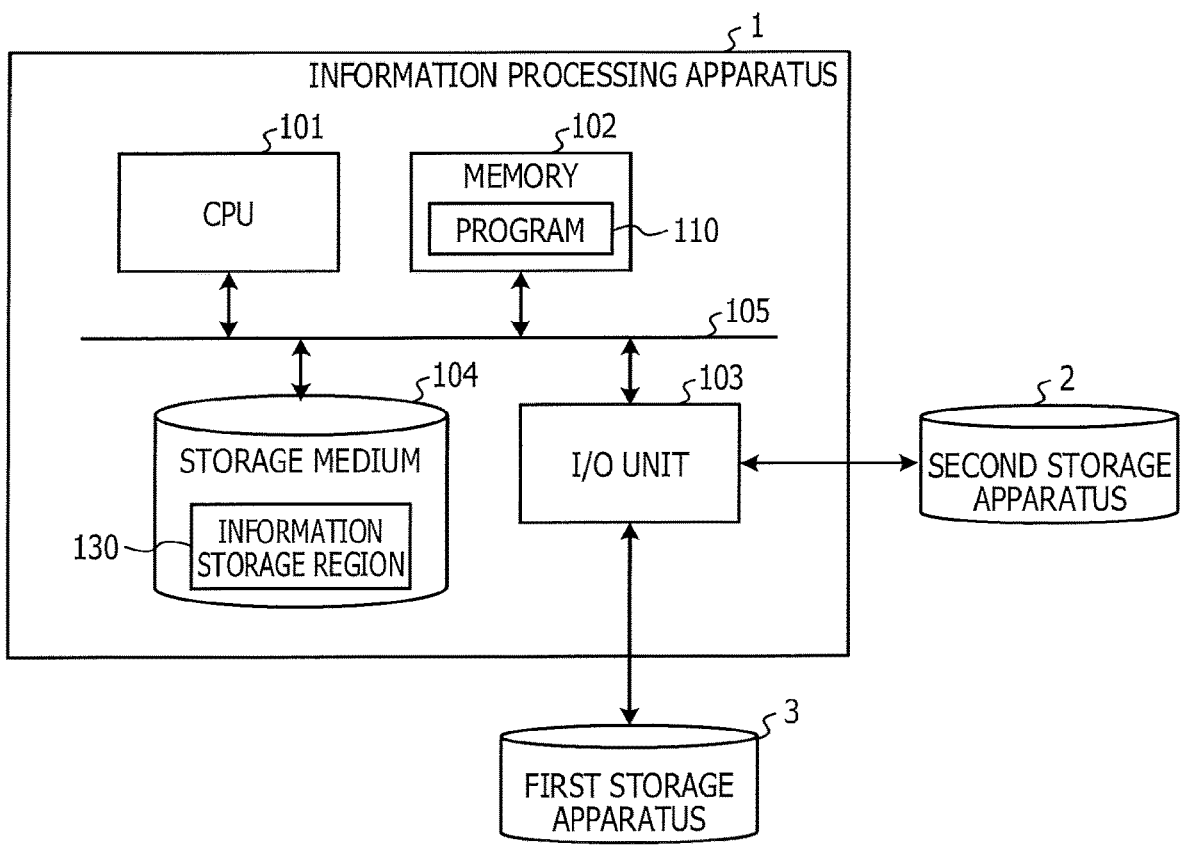
FIG. 2 is a view depicting a hardware configuration of an information processing apparatus.

Now, a hardware configuration of the online system 10 is described. FIG. 2 is a view depicting a hardware configuration of an information processing apparatus. The information processing apparatus may be the information processing apparatus 1 depicted in FIG. 1.

The information processing apparatus 1 includes a central processing unit (CPU) 101 that is a processor, a memory 102, an external interface (input/output (I/O) unit) 103 and a storage medium 104. The respective components are coupled to each other by a bus 105.

The storage medium 104 stores, for example, in a program storage region (not depicted) in the storage medium 104, a program 110 for performing a process for storing each data included in target data DT1 into the storage apparatus 3 (the process is hereinafter referred to also as data loading process). Further, the storage medium 104 includes an information storage region 130 (hereinafter referred to also as storage unit 130) for storing, for example, information to be used when a data loading process is to be performed.

Upon execution of the program 110, the CPU 101 loads the program 110 from the storage medium 104 into the memory 102 and cooperates with the program 110 to perform a data loading process. Meanwhile, the external interface 103 performs communication, for example, with the storage apparatus 2 and the storage apparatus 3.

[Functions of Online System]

Figure 3:
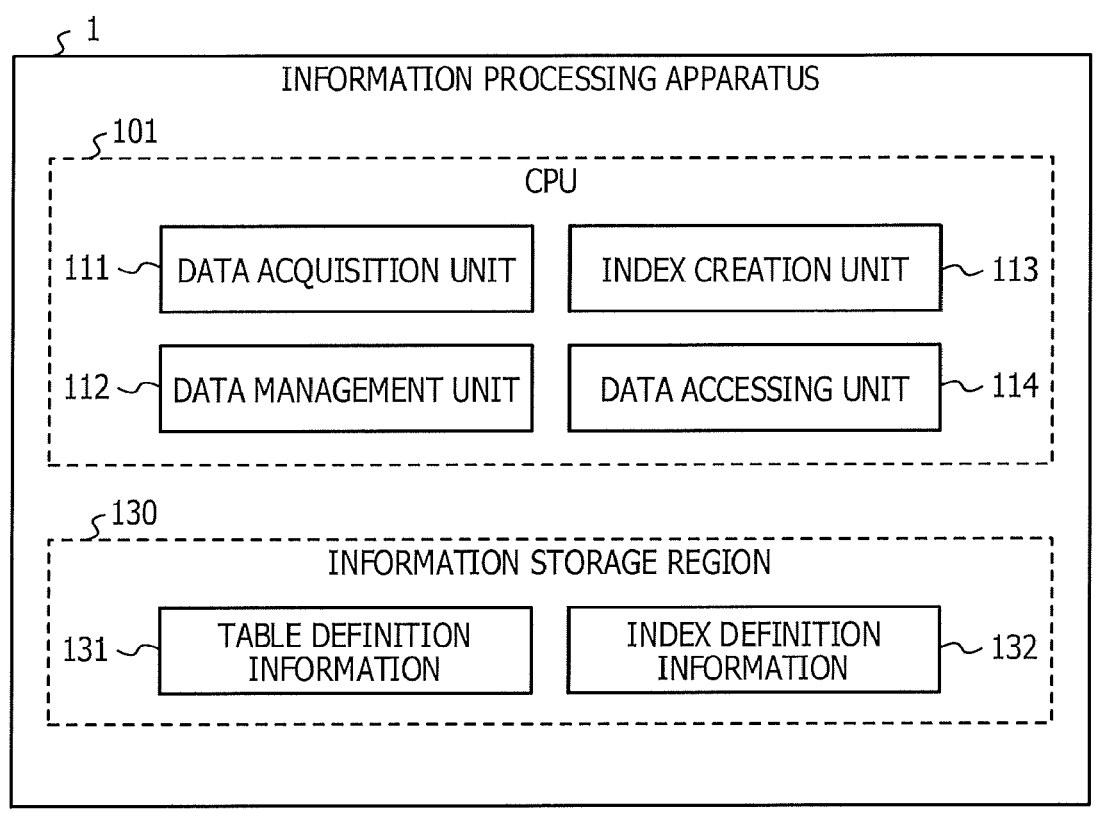
FIG. 3 is a functional block diagram of an information processing apparatus.

Now, functions of the online system 10 are described. FIG. 3 is a functional block diagram of an information processing apparatus. The information processing apparatus may be the information processing apparatus depicted in FIG. 1.

The CPU 101 of the information processing apparatus 1 operates, for example, as a data acquisition unit 111, a data management unit 112, an index creation unit 113 and a data accessing unit 114 through cooperation with the program 110. Meanwhile, into the information storage unit 130, for example, table definition information 131 and index definition information 132 are stored. It is to be noted that the data acquisition unit 111, the data management unit 112, the index creation unit 113 and the data accessing unit 114 may operate in physical machines different from one another.

The data acquisition unit 111 acquires each data included in target data DT1 stored in the storage apparatus 2 in order prioritizing creation source data corresponding to a column or column to be used for creation of an index IDX of the target data DT1 (the index IDX is hereinafter referred to also as index information IDX). For example, the data acquisition unit 111 refers to the information storage region 130, in which the index definition information 132 (hereinafter referred to also as identification information 132) for identifying a column to be used for creation of index information IDX is stored to perform specification of the column to be used for creation of index information IDX. A particular example of the index definition information 132 is hereinafter described.

The data management unit 112 stores data acquired by the data acquisition unit 111 individually into the storage apparatus 3.

The index creation unit 113 creates, in response to that creation source data is acquired from the storage apparatus 3, index information IDX from the acquired creation source data. Thereafter, the data management unit 112 stores the created index information IDX into the storage apparatus 3. It is to be noted that the index creation unit 113 may create, in response to that creation source data is stored into the storage apparatus 3, index information IDX from the stored creation source data.

The data accessing unit 114 performs, when it accepts an access request to data included in the target data DT1 stored in the storage apparatus 3, accessing to the data for which the access request is received. For example, where index information IDX corresponding to data to which an access request is received is created and this index information IDX is to be utilized, the data accessing unit 114 refers to the information storage region 130 in which the index information IDX created by the index creation unit 113 is stored to specify the storage position of the data to which the access request is received. Then, the data accessing unit 114 performs accessing to the specified storage position. It is to be noted that the table definition information 131 is hereinafter described.

First Embodiment

Figure 4:
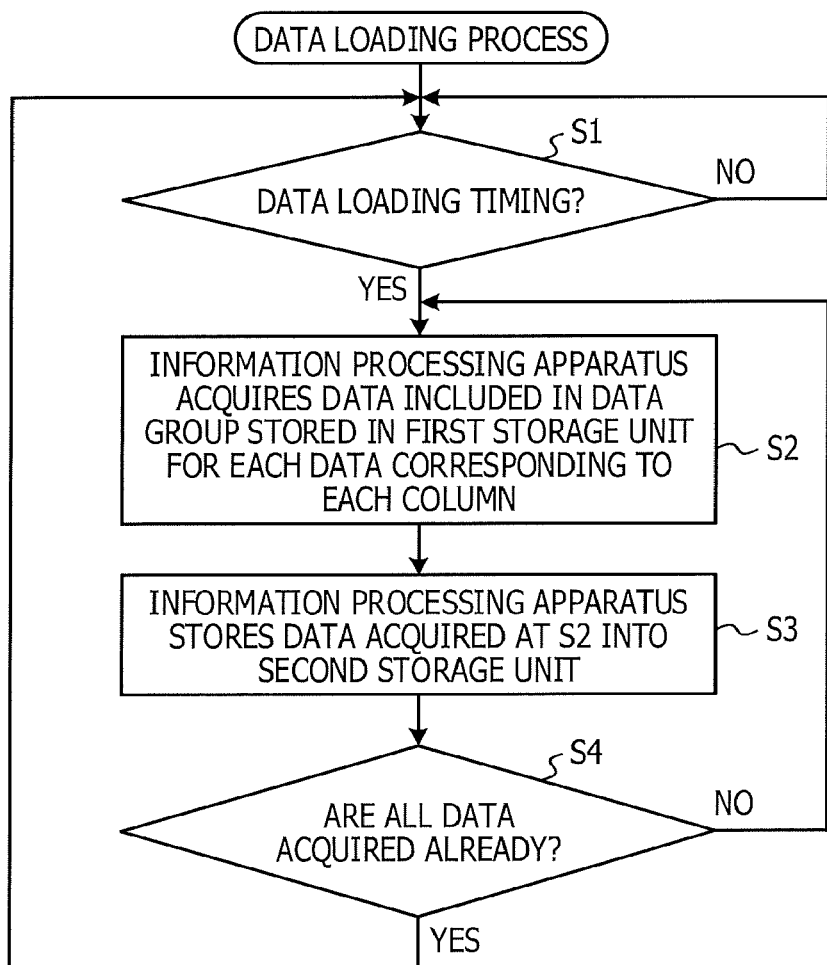
FIG. 4 is a flow chart illustrating an outline of a data loading process in a first embodiment.
Figure 5:
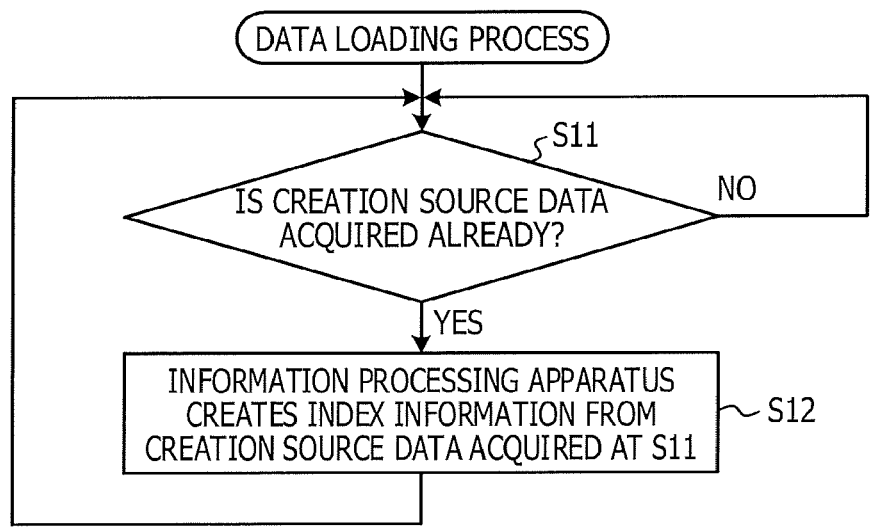
FIG. 5 is a flow chart illustrating an outline of another data loading process in the first embodiment.
Figure 6:
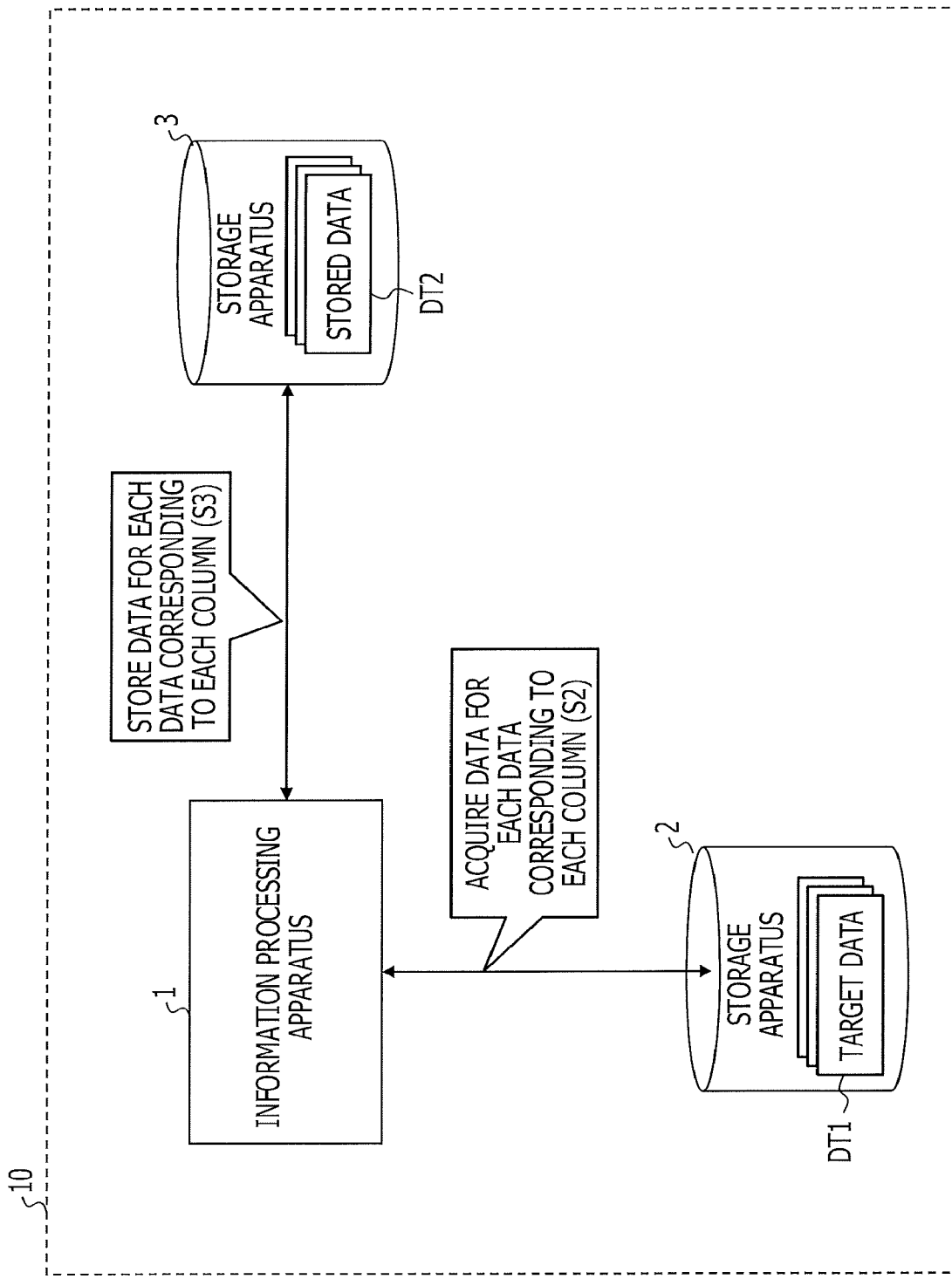
FIG. 6 is a view illustrating an outline of a data loading process in the first embodiment.
Figure 7:
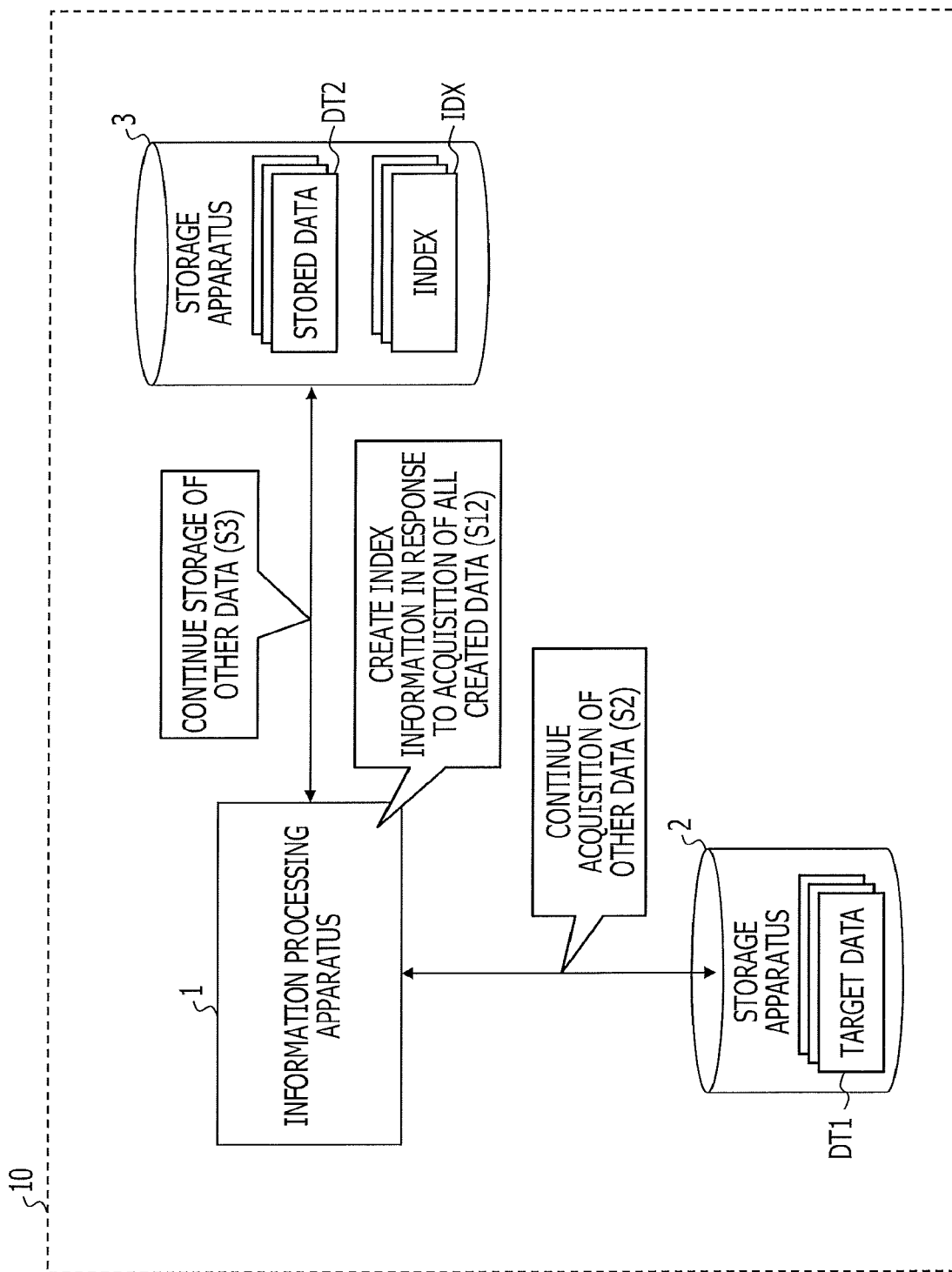
FIG. 7 is a view illustrating an outline of another data loading process in the first embodiment.

Now, an outline of a first embodiment is described. FIG. 4 are 5 are flow charts illustrating an outline of a data loading process in the first embodiment. Meanwhile, FIGS. 6 and 7 are views illustrating an outline of a data loading process in the first embodiment. Details of the data loading process of FIGS. 4 and 5 are described with reference to FIGS. 6 and 7.

As depicted in FIG. 4, the information processing apparatus 1 waits until a data loading timing comes (NO at S1). The data loading timing may be a point of time determined in advance as a point of time at which, for example, the online system 10 is to be activated. Alternatively, the data loading timing may be a timing at which, for example, business operator operates an operation terminal (not depicted) to input information that the online system 10 is to be activated.

Then, when the data loading timing comes (YES at S1), the information processing apparatus 1 acquires data included in the target data DT1 stored in the storage apparatus 2 for each data corresponding to each column as depicted in FIG. 6 (S2). For example, the information processing apparatus 1 performs acquisition of each data included in the target data DT1 stored in the storage apparatus 2 while prioritizing creation source data corresponding to a column to be used for creation of index information IDX of the target data DT1. Further, the information processing apparatus 1 stores the data acquired by the process at step S2 into the storage apparatus 3 as depicted in FIG. 6 (S3).

Thereafter, the information processing apparatus 1 performs decision of whether or not acquisition of all data included in the target data DT1 has been performed (S4). If it is decided that acquisition of all data has not been performed (NO at S4), the information processing apparatus 1 performs the processes at the steps beginning with S2 again. On the other hand, if it is decided that acquisition of all data has been performed (YES at S4), the information processing apparatus 1 waits for a next data loading timing (S1).

On the other hand, the information processing apparatus 1 waits that acquisition of creation source data to be used for creation of a certain one piece of index information IDX from within the data included in the target data DT1 is completed as depicted in FIG. 5 (NO at S11). Then, when acquisition of creation source data is completed (YES at S11), the information processing apparatus 1 creates index information IDX from the creation source data acquired by the process at S11 as depicted in FIG. 7 (S12). Thereafter, the information processing apparatus 1 stores the created index information IDX into the storage apparatus 3.

For example, while the information processing apparatus 1 performs the processes at S1 to S4, it performs detection of index information IDX that becomes possible to create because acquisition of all source data to be used for creation is completed. Then, when the information processing apparatus 1 detects index information IDX with regard to which acquisition of all creation source data to be used for creation is completed, it performs creation of detected index information IDX without waiting completion of acquisition of all data included in the target data DT1. Thereafter, the information processing apparatus 1 continuously performs acquisition of data other than the creation source data to be used for creation of detected index information IDX (such data other than the creation source data is referred to also as different data) and storage of the different data into the storage apparatus 3 as depicted in FIG. 7 (S2 and S3).

Consequently, the information processing apparatus 1 may reduce the period of time required for storage of data included in the target data DT1 and creation of index information IDX. Therefore, even if, for example, there is a restriction on the activation time of the online system 10, the information processing apparatus 1 may increase the probability that the restriction may be satisfied.

Details of First Embodiment

Now, details of the first embodiment are described. FIGS. 8 to 12 are flow charts illustrating details of a data loading process in the first embodiment. Further, FIGS. 13 to 18 are views illustrating details of a data loading process in the first embodiment. Details of the data loading process of FIGS. 8 to 12 are described below with reference to FIGS. 13 to 18.

Figure 8:
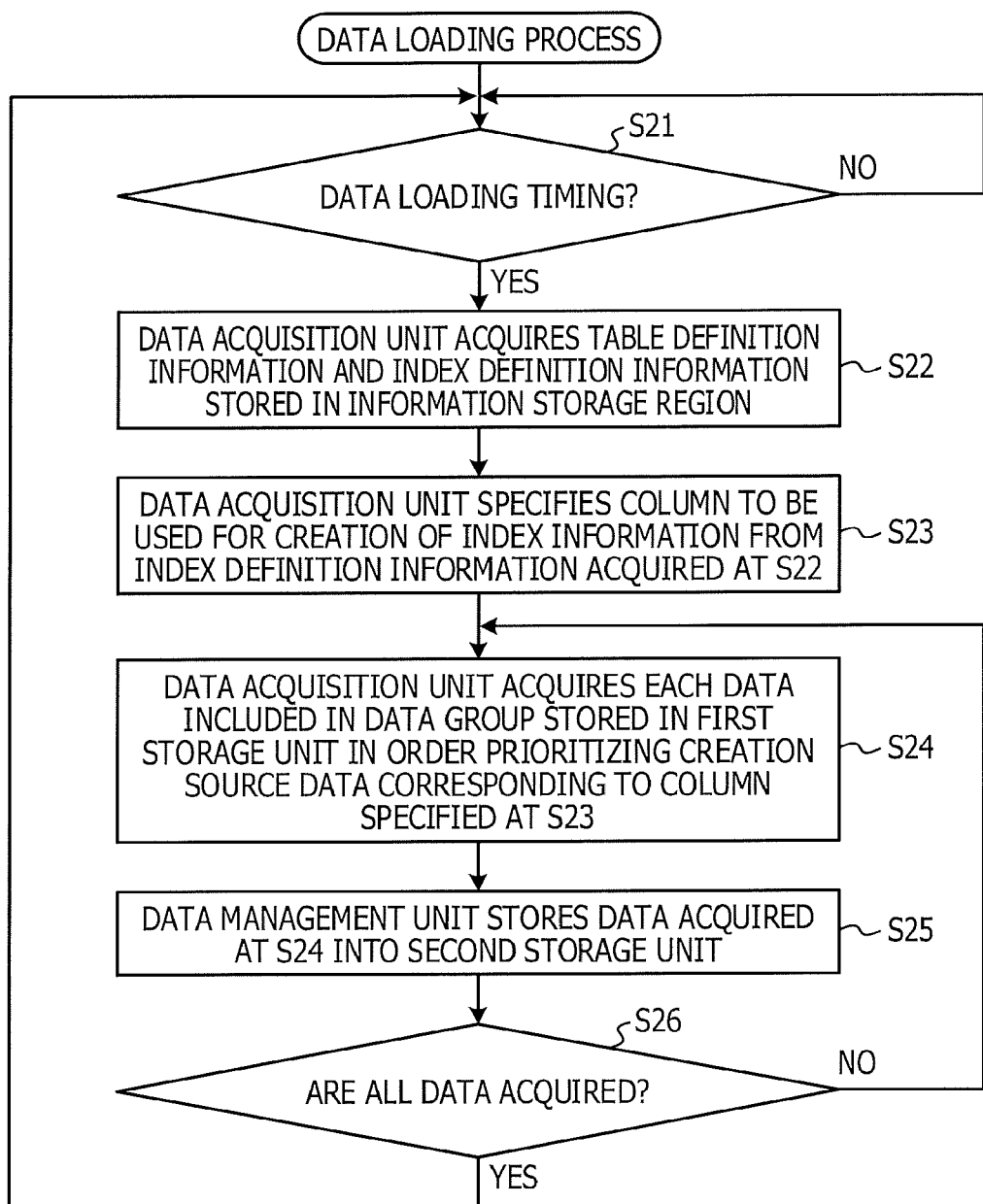
FIGS. 8 to 12 are flow charts illustrating details of a data loading process in the first embodiment.

The data acquisition unit 111 of the information processing apparatus 1 waits that a data loading timing comes as depicted in FIG. 8 (NO at S21). Then, when a data loading timing comes (YES at S21), the data acquisition unit 111 acquires the table definition information 131 and the index definition information 132 stored in the information storage unit 130 (S22). The table definition information 131 is information that defines a table in which each data included in the target data DT1 is stored. Meanwhile, the index definition information 132 is information that defines index information IDX corresponding to each data stored in the table defined by the table definition information 131. In the following, a particular example of the table definition information 131 and the index definition information 132 is described.

[Particular Example of Table Definition Information and Index Definition Information]

FIGS. 13A and 13B are views illustrating a particular example of table definition information and index definition information. The table definition information and the index definition information are the table definition information 131 and the index definition information 132 depicted in FIG. 3. Meanwhile, FIG. 15 is a view illustrating a particular example of index definition information. The index definition information may be the index definition information 132 depicted in FIG. 3. For example, FIG. 13A is a view illustrating a particular example of the table definition information 131. Meanwhile, FIG. 13B and FIG. 15 are views illustrating particular examples of the index definition information 132.

The table definition information 131 depicted in FIG. 13A is information that defines a table whose name is employee table (the table is hereinafter referred to also as employee table). Meanwhile, the index definition information 132 depicted in FIG. 13B is information that defines index information IDX corresponding to data stored in the employee table.

For example, the table definition information 131 depicted in FIG. 13A defines that the employee table includes, as columns thereof, "employee number," "name," "age," "department code," "department name," "position" and "position joined date." It is to be noted that, in the table definition information 131 depicted in FIG. 13A, the data type of each data corresponding to "employee number," "age" and "department code" is the integer type, and the data type of each data corresponding to "name," "department name" and "position" is the character string type while the data type of data corresponding to "position joined date" is the date type. Description of the other information included in FIG. 13A is omitted herein.

The index definition information 132 depicted in FIG. 13B indicates that the index information IDX corresponding to the data stored in the employee table is created from the data corresponding to "department code" and "position" from among the data stored in the employee table. Description of the other information included in FIG. 13B is omitted herein.

[Particular Example of Employee Table after Target Data is Stored]

Now, description is given of a particular example in which each data included in the target data DT1 is stored into an employee table created based on the table definition information 131 described with reference to FIG. 13A. FIG. 14 is a view illustrating a particular example of the employee table after the target data DT1 is stored.

The employee table depicted in FIG. 14 includes columns corresponding to "employee number," "name," "age," "department code," "department name," "position" and "position joined date." For example, the employee table depicted in FIG. 14 includes respective columns defined in the table definition information 131 described with reference to FIG. 13A.

For example, in the employee table depicted in FIG. 14, for the information in which "employee number" is "1023," "Ichiro TANAKA" is set as the "name" and "55" is set as the "age." Further, in the employee table depicted in FIG. 14, for the information in which the "employee number" is "1023," "103" is set as "department code"; "third development department" is set as "department name"; "Manager" is set as "position"; and "1985/4/1" is set as "position joined date." Description of the other information included in FIG. 14 is omitted herein.

Referring back to FIG. 8, the data acquisition unit 111 specifies a column or columns to be utilized for creation of index information IDX from the index definition information 132 acquired by the process at S22 (S23). In the following, details of the process at S23 are described.

[Details of Process at S23]

Figure 9:
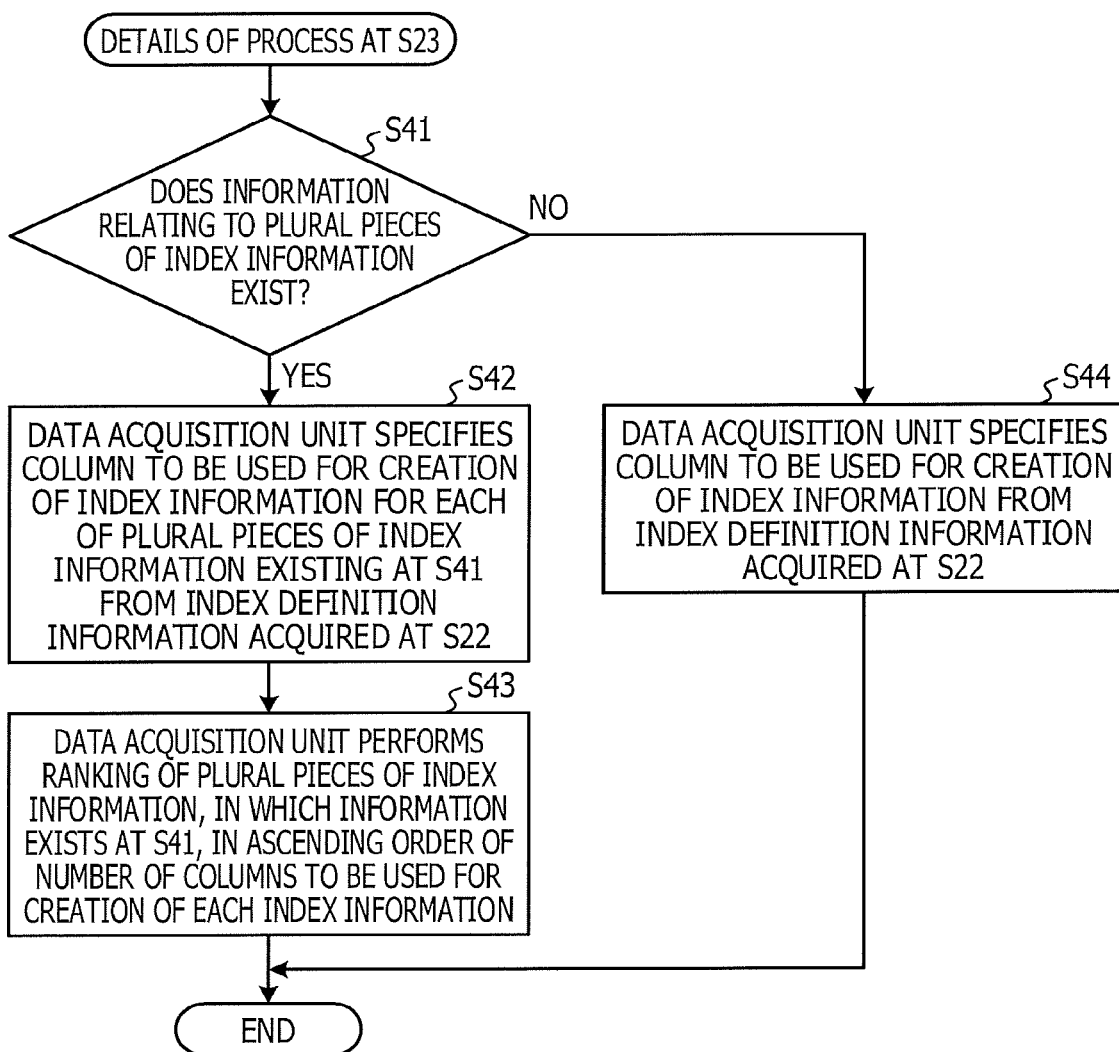

FIG. 9 is a view illustrating details of the process at S23. The data acquisition unit 111 decides whether or not information relating to a plurality of pieces of index information IDX is included in the index definition information 132 acquired by the process at S22 as depicted in FIG. 9 (S41).

If information relating to a plurality of pieces of index information IDX is included in the index definition information 132 (YES at S41), the data acquisition unit 111 specifies a column to be used for creation of index information IDX for each of the pieces of index information IDX decided to exist by the process at S41 from within the index definition information 132 acquired by the process at S22 (S42).

Then, the data acquisition unit 111 performs ranking of the plurality of pieces of index information IDX in which information is decided to exist by the process at S41 in an ascending order of the number of columns to be used for creation of each index information IDX (S43).

On the other hand, if information relating to the plurality of pieces of index information IDX is not included in the index definition information 132 as a result of the process at S41 (NO at S41), the data acquisition unit 111 specifies a column to be used for creation of index information IDX (one piece of index information IDX) from the index definition information 132 acquired by the process at S22 (S44).

For example, the index definition information 132 described with reference to FIG. 13B indicates that index information IDX corresponding to the employee table is created from data stored corresponding to "department code" and "position." Therefore, when the data acquisition unit 111 acquires the index definition information 132 described with reference to FIG. 13B by the process at S22, it specifies "department code" and "position" that are columns in which data to be used for creation of index information IDX are stored (NO at S41 and S44).

In contrast, the index definition information 132 depicted in FIG. 15 defines two pieces of index information IDX as index information IDX corresponding to the employee table. For example, the index definition information 132 depicted in FIG. 15 defines index information IDX created from the data stored corresponding to "department code" and "position" (hereinafter referred to also as index information IDXa) and index information IDX created from the data stored corresponding to "employee number" (hereinafter referred to also as index information IDXb).

Therefore, when the data acquisition unit 111 acquires the index definition information 132 depicted in FIG. 15 by the process at S22, it individually specifies "department code" and "position" that are columns in which data to be used for creation of index information IDXa is stored and "employee number" that is a column in which data to be used for creation of index information IDXb are stored (YES at S41 and S42). Then, the data acquisition unit 111 performs determination of priority ranking of the pieces of index information IDX such that the priority rank of the index information IDXb with regard to which the number of columns in which data to be used for creation is stored is "1" is higher than the priority rank of the index information IDXa with regard to which the number of columns in which data to be used for creation is stored is "2" (S43).

Referring back to FIG. 8, the data acquisition unit 111 acquires each data included in the target data DT1 stored in the storage apparatus 2 in order prioritizing creation source data corresponding to the column or columns specified by the process at S23 (S24). For example, the data acquisition unit 111 acquires one piece of the data included in the target data DT1 stored in the storage apparatus 2 by the process at S24. In the following, details of the process at S24 are described.

[Details of Process at S24]

Figure 10:
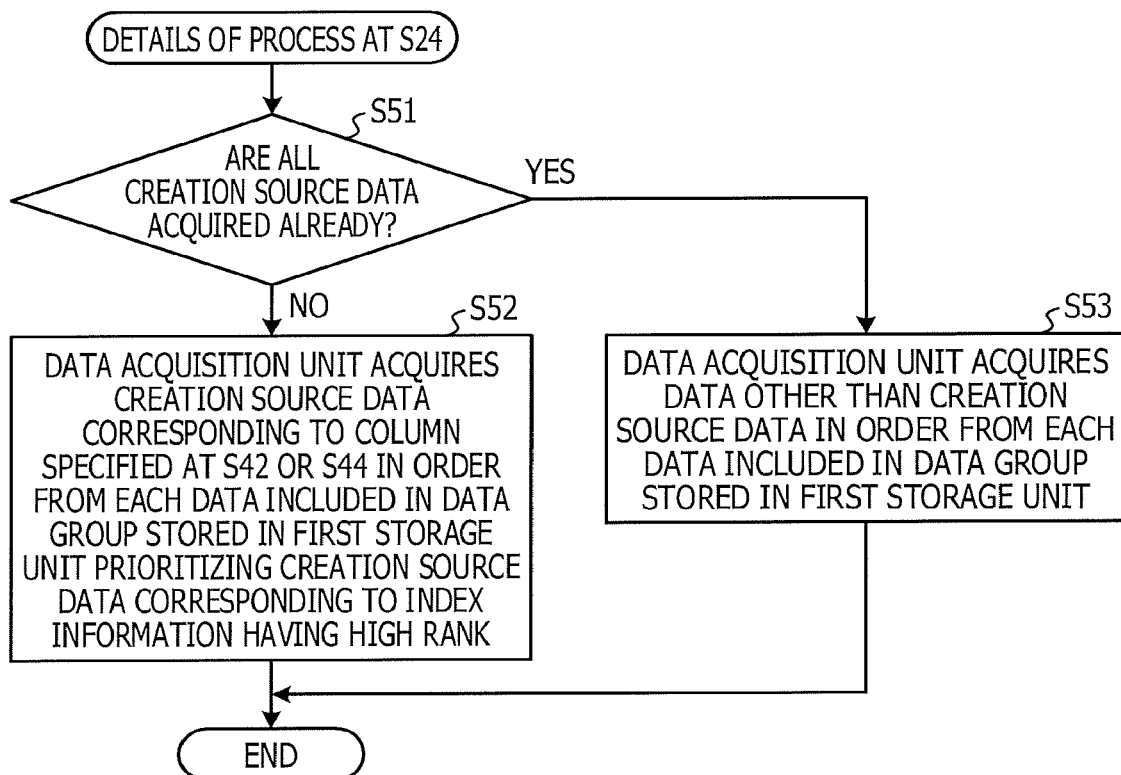
Figure 11:
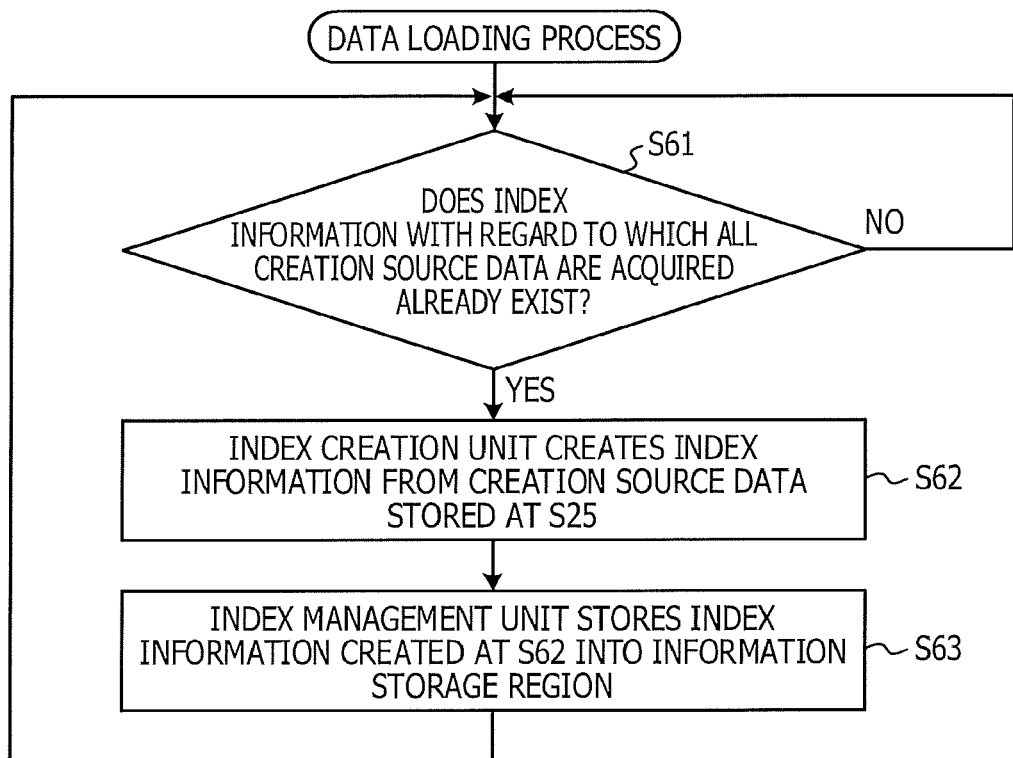

FIG. 10 is a view illustrating details of the process at S24. As depicted in FIG. 10, the data acquisition unit 111 decides whether or not acquisition of all creation source data from among the data included in the target data DT1 is completed (S51).

If it is decided that acquisition of all creation source data is not completed (NO at S51), the data acquisition unit 111 acquires the creation source data corresponding to the column or columns specified by the process at S42 or S44 in order from each data included in the target data DT1 stored in the storage apparatus 2 prioritizing creation source data corresponding to index information IDX having a high priority rank (S52).

For example the data acquisition unit 111 preferentially performs acquisition of creation source data to be used for creation of index information IDX from among each data included in the target data DT1 stored in the storage apparatus 2. Then, if a plurality of pieces of index information IDX are defined in the index definition information 132, the data acquisition unit 111 performs acquisition of creation source data to be used for creation of index information IDX in order beginning with creation source data corresponding to the piece of index information IDX having a high priority rank.

Consequently, the index creation unit 113 of the information processing apparatus 1 may advance the point of time at which creation of index information IDX is to be started as hereinafter described. Therefore, it becomes possible for the information processing apparatus 1 to quickly perform storage of the target data DT1 into the storage apparatus 3 and creation of index information IDX.

On the other hand, if it is decided by the process at S51 that acquisition of all creation source data is completed (YES at S51), the data acquisition unit 111 acquires data other than the creation source data in order from each data included in the target data DT1 stored in the storage apparatus 2 (S53). For example, the data acquisition unit 111 refers to the table definition information 131 acquired by the process at S22 to specify a column or columns that are not used for creation of index information IDX from among the columns defined in the table definition information 131 and performs acquisition of the data corresponding to the specified columns in order.

Referring back to FIG. 8, the data management unit 112 stores the data acquired by the process at S24 into the storage apparatus 3 (S25). Thereafter, if acquisition of all data included in the target data DT1 is not completed (NO at S26), the data acquisition unit 111 performs the processes at the steps beginning with S24 again. On the other hand, if acquisition of all data included in the target data DT1 is completed (YES at S26), the data acquisition unit 111 waits till a next data loading timing (S21). In the following, a particular example of the processes at S24 and S25 is described.

[Particular Example of Processes at S24 and S25]

FIGS. 16 to 18 are views illustrating a particular example of processes at S24 and S25 of FIG. 8. FIG. 16 is a view illustrating a particular example of the processes at S24 and S25 when the index definition information 132 described with reference to FIG. 13B is acquired. Meanwhile, FIGS. 17 and 18 are views illustrating a particular example of the processes at S24 and S25 when the index definition information 132 described with reference to FIG. 15 is acquired.

For example, if the index definition information 132 described with reference to FIG. 13B is acquired by the process at S22, the data acquisition unit 111 acquires data corresponding to "department code" and "position" from among the data included in the target data DT1 (S24). Then, the data management unit 112 performs storage of the data corresponding to "department code" and "position" as depicted in FIG. 16 (S25). Thereafter, the data management unit 112 performs storage of the data other than the data corresponding to "department code" and "position" as depicted in FIG. 14 (S24 and S25).

On the other hand, if the index definition information 132 depicted in FIG. 15 is acquired by the process at S22, the data acquisition unit 111 acquires, from among the data included in the target data DT1, data included in "employee number" that is a column to be used for creation of index information IDXb having a high priority rank (S24). Then, the data management unit 112 performs storage of the data corresponding to the "employee number" as depicted in FIG. 17 (S25). Then, the data acquisition unit 111 acquires data included in "department code" and "position" that are columns to be used for creation of the index information IDXa having a low priority rank (S24). Then, the data management unit 112 performs storage of the data corresponding to "department code" and "position" as depicted in FIG. 18 (S25). Thereafter, the data management unit 112 performs storage of the data other than the data corresponding to "employee number," "department code" and "position" as depicted in FIG. 14 (S24 and S25).

Referring back to FIG. 11, the index creation unit 113 waits that existence of index information IDX with regard to which acquisition of all creation source data to be used for creation is completed is detected (NO at S61). Then, if existence of index information IDX with regard to which acquisition of all creation source data to be used for creation is completed is detected (YES at S61), the index creation unit 113 creates index information IDX from the creation source data stored in the storage apparatus 2 by the process at S25 (creation source data acquired by the process at S24) (S62). Thereafter, the data management unit 112 stores the index information IDX created by the process at S62 into the information storage unit 130 (S63).

For example, if the index definition information 132 depicted in FIG. 13B is acquired, the index creation unit 113 starts creation of index information IDX corresponding to the "department code" and "position" in response to that acquisition of the data corresponding to "department code" and "position" is completed as described with reference to FIG. 16.

On the other hand, if the index definition information 132 depicted in FIG. 15 is acquired, the index creation unit 113 starts creation of index information IDX corresponding to "employee number" (index information IDXb) in response to that acquisition of data corresponding to the "employee number" is completed as described with reference to FIG. 17. Thereafter, the index creation unit 113 starts creation of index information IDX corresponding to "department code" and "position" (index information IDXa) in response to that acquisition of the data corresponding to "department code" and "position" is completed as described with reference to FIG. 18.

Consequently, the index creation unit 113 may start creation of index information IDX precedently without waiting completion of acquisition of all data included in the target data DT1. Therefore, the information processing apparatus 1 may decrease the period of time required for storage of each data included in the target data DT1 and creation of index information IDX.

[Data Accessing Process]

Figure 12:
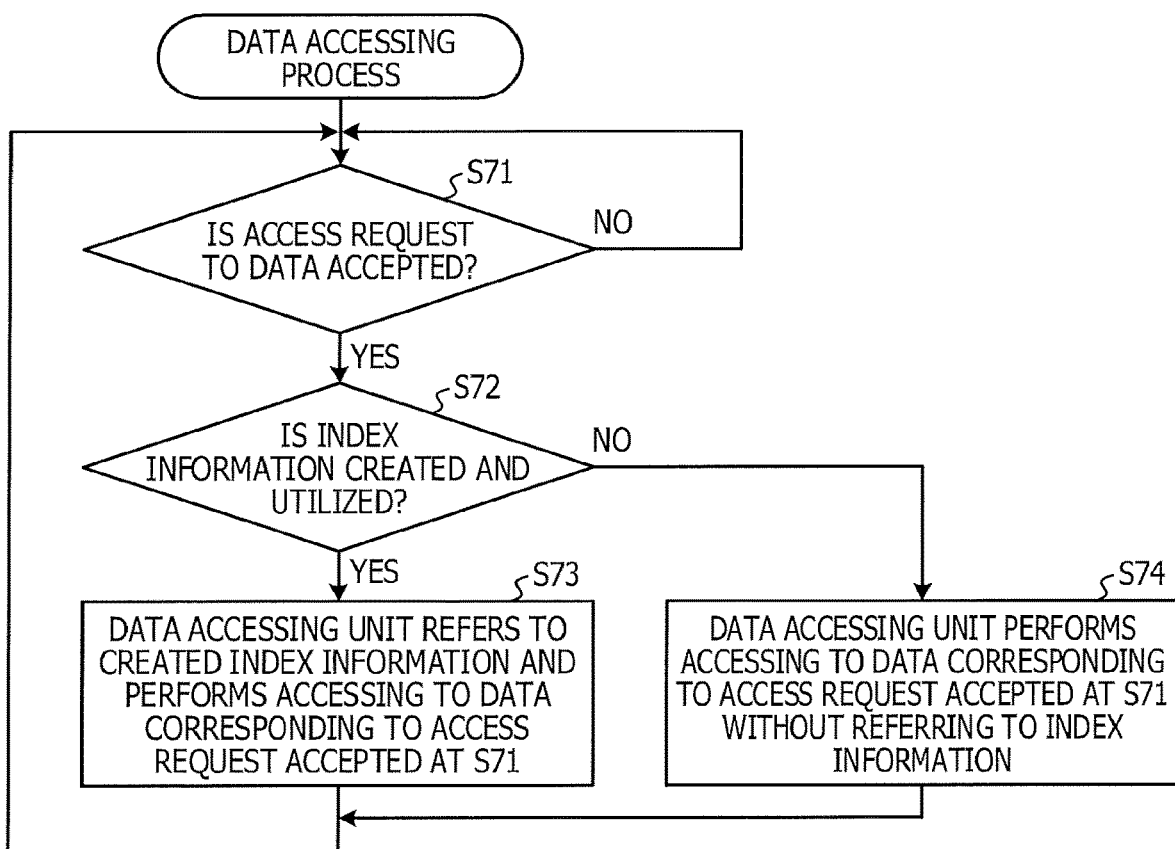

Now, a process when an access request to the target data DT1 (stored data DT2) stored in the storage apparatus 3 (hereinafter referred to also as data accessing process) is performed is described. FIG. 12 is a flow chart illustrating the data accessing process.

As depicted in FIG. 12, the data accessing unit 114 waits that an access request to data (a reading out request or a writing request of data or the like) included in the stored data DT2 is accepted (NO at S71). For example, the data accessing unit 114 waits that an access request, for example, performed by a user through an operation terminal (not depicted) is accepted.

Then, when an access request to data included in the stored data DT2 is accepted (YES at S71), the data accessing unit 114 refers to the information storage region 130 to decide whether or not index information IDX of data corresponding to the access request accepted by the process at S71 is created and besides the index information IDX is to be utilized (S72).

If it is decided that index information IDX of data corresponding to the access request accepted by the process at S71 is created and besides the index information IDX is to be utilized (YES at S72), the data accessing unit 114 refers to the index information IDX stored in the information storage unit 130 to specify a storage position of the data corresponding to the access request accepted by the process at S71. Then, the data accessing unit 114 performs accessing to the storage position specified by the process at S72 (S73). Thereafter, the data accessing unit 114 performs outputting and so forth of a result of the accessing as occasion demands.

On the other hand, if it is decided that index information IDX of data corresponding to the access request accepted by the process at S71 is not created or the index information IDX is not to be utilized (NO at S72), the data accessing unit 114 performs accessing to the data corresponding to the access request accepted by the process at S71 without referring to the index information IDX (S74). Thereafter, the data accessing unit 114 performs outputting and so forth of a result of the accessing as occasion demands.

In this manner, the information processing apparatus 1 in the present embodiment acquires each data included in the target data DT1 stored in the storage apparatus 2 in order prioritizing creation source data corresponding to a column or columns to be used for creation of index information IDX of the target data DT1 and stores the acquired data into the storage apparatus 3. Then, the information processing apparatus 1 creates index information IDX from the stored creation source data in response to that the creation source data is stored into the storage apparatus 3.

Consequently, the information processing apparatus 1 may reduce the period of time required for storage of data included in the target data DT1 and creation of index information IDX. Therefore, even where, for example, there is a restriction to the activation time of the online system 10, the information processing apparatus 1 may increase the possibility that the activation time of the online system 10 may satisfy the restriction.

Second Embodiment

Now, a data loading process in a second embodiment is described. In the second embodiment, different from the first embodiment, target data DT1 stored in a storage apparatus 2 is stored into a plurality of storage apparatus 3.

[Configuration of Online System in Second Embodiment]

Figure 19:
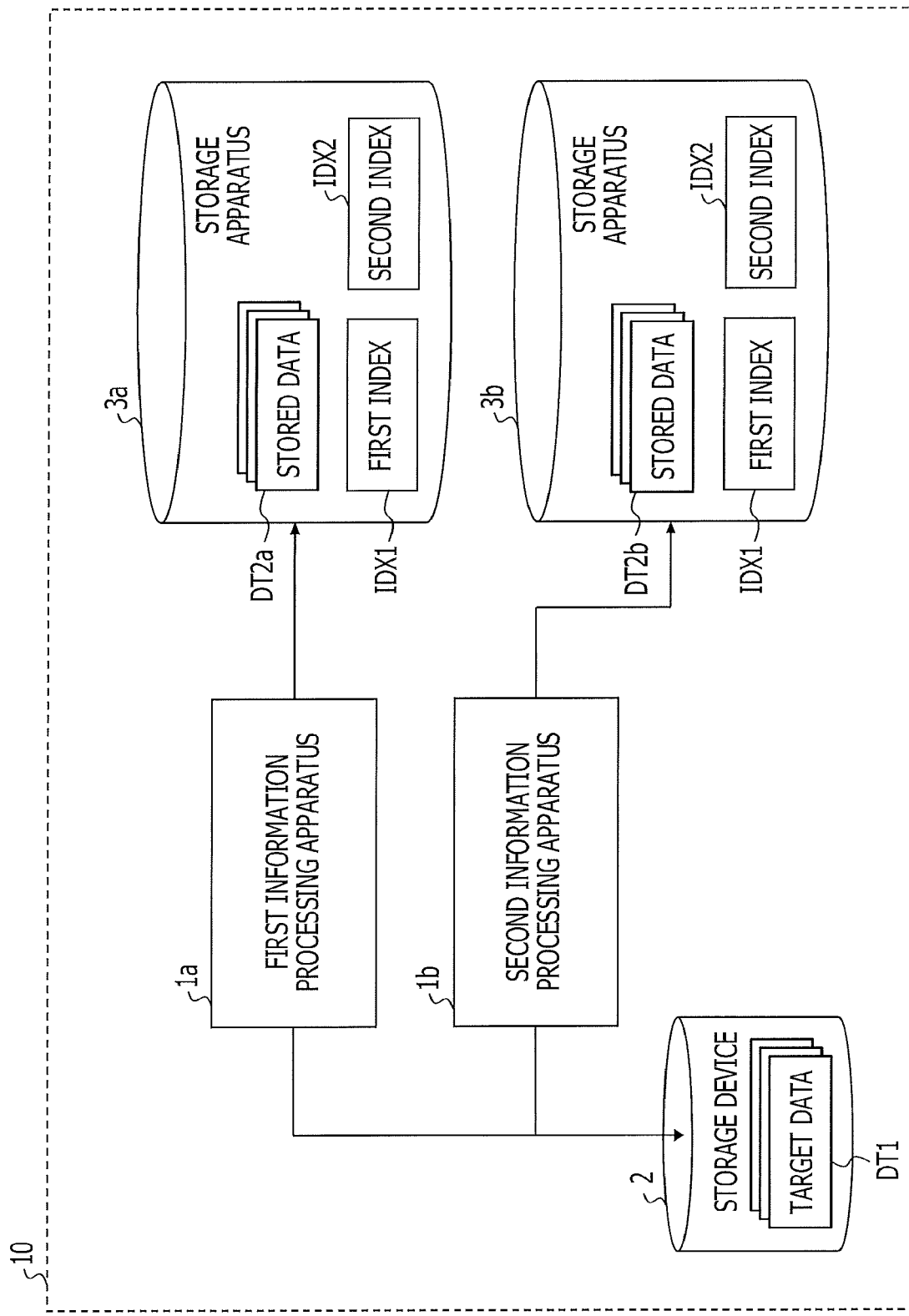
FIG. 19 is a view depicting a configuration of an online system according to a second embodiment.

First, a configuration of an online system 10 in the second embodiment is described. FIG. 19 is a view depicting a configuration of an online system according to a second embodiment. An online system 10 depicted in FIG. 19 includes an information processing apparatus 1a (hereinafter referred to as first information processing apparatus 1a), another information processing apparatus 1b (hereinafter referred to also as second information processing apparatus 1b), a storage apparatus 2, another storage apparatus 3a and a further storage apparatus 3b.

The first information processing apparatus 1a and the second information processing apparatus 1b retain data of the same substance as each other. Further, the first information processing apparatus 1a and the second information processing apparatus 1b configure a cluster system. Therefore, the first information processing apparatus 1a may continue a process, which has been performed by the second information processing apparatus 1b, by performing switching. Further, the second information processing apparatus 1b may continue a process, which has been performed by the first information processing apparatus 1a, by performing switching.

It is to be noted that, although the following description is given of a case in which the online system 10 includes a cluster system configured from the first information processing apparatus 1a and the second information processing apparatus 1b, the online system 10 may include a cluster system that includes three or more information processing apparatus.

The storage apparatus 3a and the storage apparatus 3b each store respective data included in target data DT1 stored in the storage apparatus 2. In the following description, data stored in the storage apparatus 3a is referred to also as stored data DT2a, and data stored in the storage apparatus 3b is referred to also as stored data DT2b. Into the storage apparatus 3a and the storage apparatus 3b, first index information IDX1 and second index information IDX2 are stored, respectively. The first index information IDX1 and the second index information IDX2 are hereinafter described.

Further, the first information processing apparatus 1a stores target data DT1 stored in the storage apparatus 2 into the storage apparatus 3a in response to that, for example, a point of time at which the online system 10 is to be activated comes. Further, the second information processing apparatus 1b stores the target data DT1 stored in the storage apparatus 2 into the storage apparatus 3b in response to that, for example, a point of time at which the online system 10 is to be activated comes. For example, the first information processing apparatus 1a and the second information processing apparatus 1b individually correspond to the information processing apparatus 1 in the first embodiment.

[Function of Online System in Second Embodiment]

Figure 20:
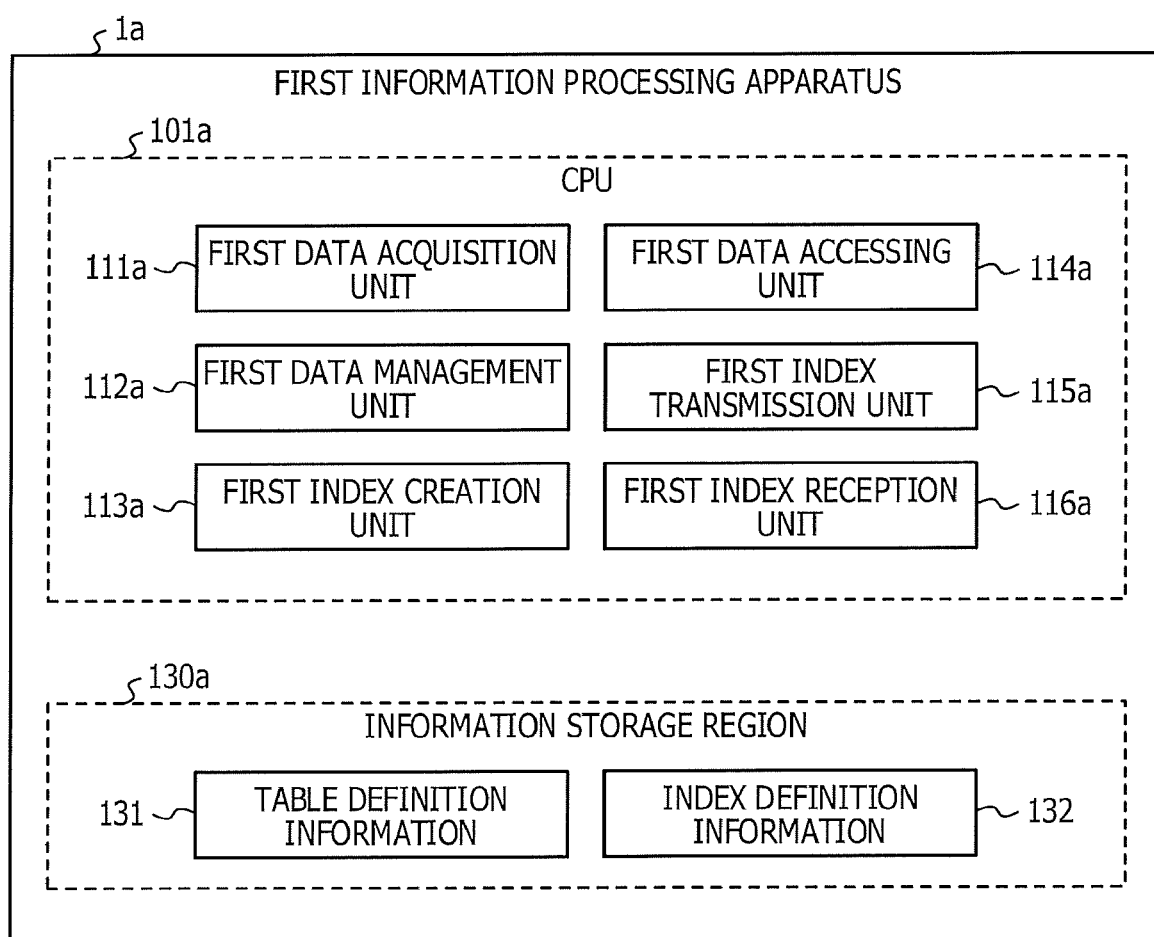
FIG. 20 is a functional block diagram of a first information processing apparatus in the second embodiment.
Figure 21:
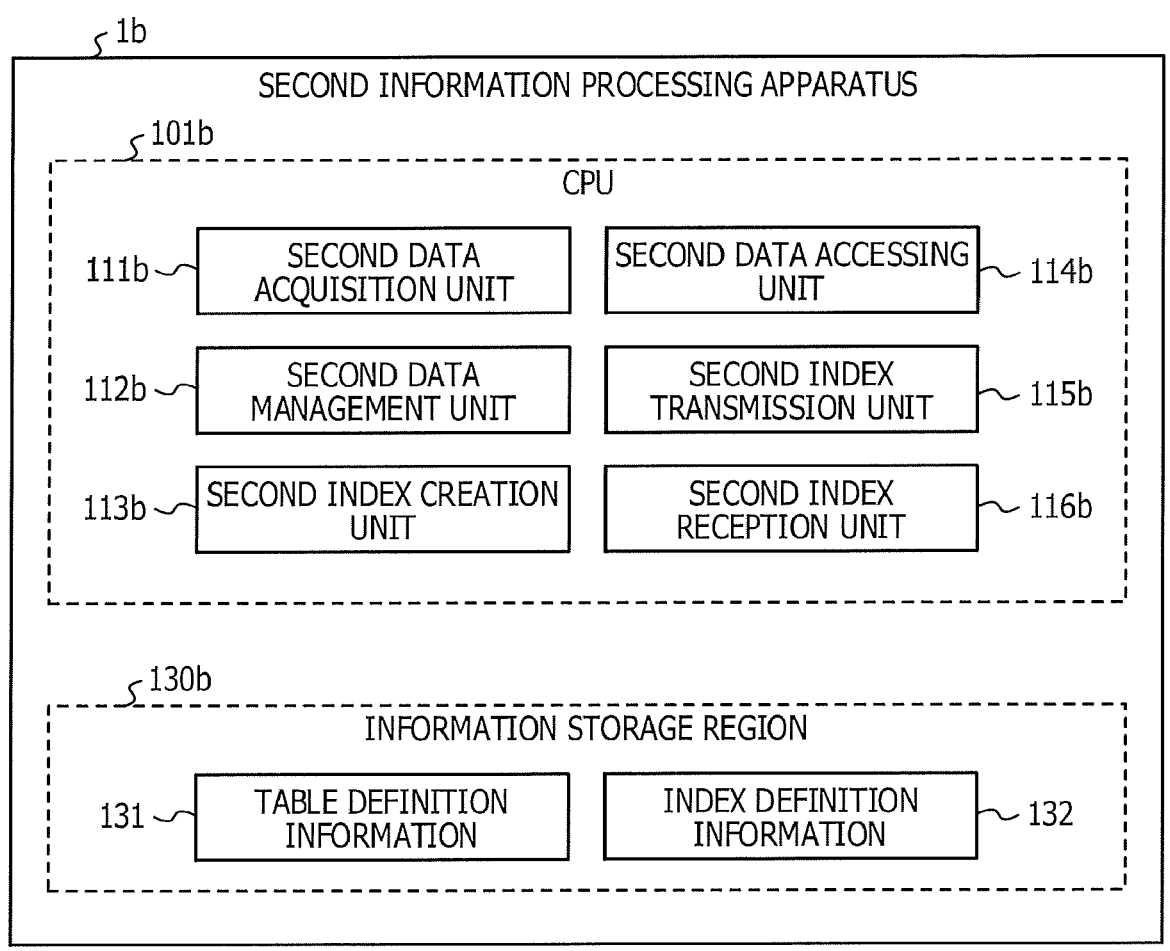
FIG. 21 is a functional block diagram of a second information processing apparatus in the second embodiment.

Now, a function of the online system 10 in the second embodiment is described. FIG. 20 is a functional block diagram of a first information processing apparatus in the second embodiment. Meanwhile, FIG. 21 is a functional block diagram of a second information processing apparatus in the second embodiment. The first information processing apparatus and the second information processing apparatus may be the first information processing apparatus 1a and the second information processing apparatus 1b depicted in FIG. 19. In the following description, CPUs in the first information processing apparatus 1a and the second information processing apparatus 1b are referred to as CPU 101a and CPU 101b, respectively. Further, programs stored in information storage regions (not depicted) of the first information processing apparatus 1a and the second information processing apparatus 1b (programs for performing a data loading process) are referred to as program 110a and program 110b, respectively. It is to be noted that the first information processing apparatus 1a and the second information processing apparatus 1b individually have a hardware configuration same as the hardware configuration of the information processing apparatus 1 described with reference to FIG. 2, and therefore, description is omitted herein.

The CPU 101a of the first information processing apparatus 1a operates, for example, as a first data acquisition unit 111a, a first data management unit 112a, a first index creation unit 113a and a first data accessing unit 114a through cooperation with the program 110a as depicted in FIG. 20. Meanwhile, the CPU 101a operates as a first index transmission unit 115a and a first index reception unit 116a through cooperation with the program 110a as depicted in FIG. 20.

Into an information storage region 130a, for example, table definition information 131 and index definition information 132 are stored similarly as in the first embodiment.

Meanwhile, the CPU 101b of the second information processing apparatus 1b operates, for example, as a second data acquisition unit 111b, a second data management unit 112b, a second index creation unit 113b and a second data accessing unit 114b through cooperation with the program 110b as depicted in FIG. 21. Further, the CPU 101 operates, for example, as a second index transmission unit 115b and a second index reception unit 116b through cooperation with the program 110b as depicted in FIG. 21.

Into an information storage region 130b, for example, table definition information 131 and index definition information 132 are each stored similarly to the information storage region 130a.

It is to be noted that the first data acquisition unit 111a and the second data acquisition unit 111b have functions same as those of the data acquisition unit 111 in the first embodiment. The first data management unit 112a and the second data management unit 112b have functions same as those of the data management unit 112 in the first embodiment. The first index creation unit 113a and the second index creation unit 113b have functions same as those of the index creation unit 113 in the first embodiment. Further, the first data accessing unit 114a and the second data accessing unit 114b have functions same as those of the data accessing unit 114 in the first embodiment. Therefore, in the following description, description of the second data acquisition unit 111b, second data management unit 112b, second index creation unit 113b and second data accessing unit 114b is omitted.

Details of Second Embodiment

In the following, details of the second embodiment are described. FIGS. 22 to 26 are flow charts illustrating details of a data loading process in the second embodiment.

Figure 22:
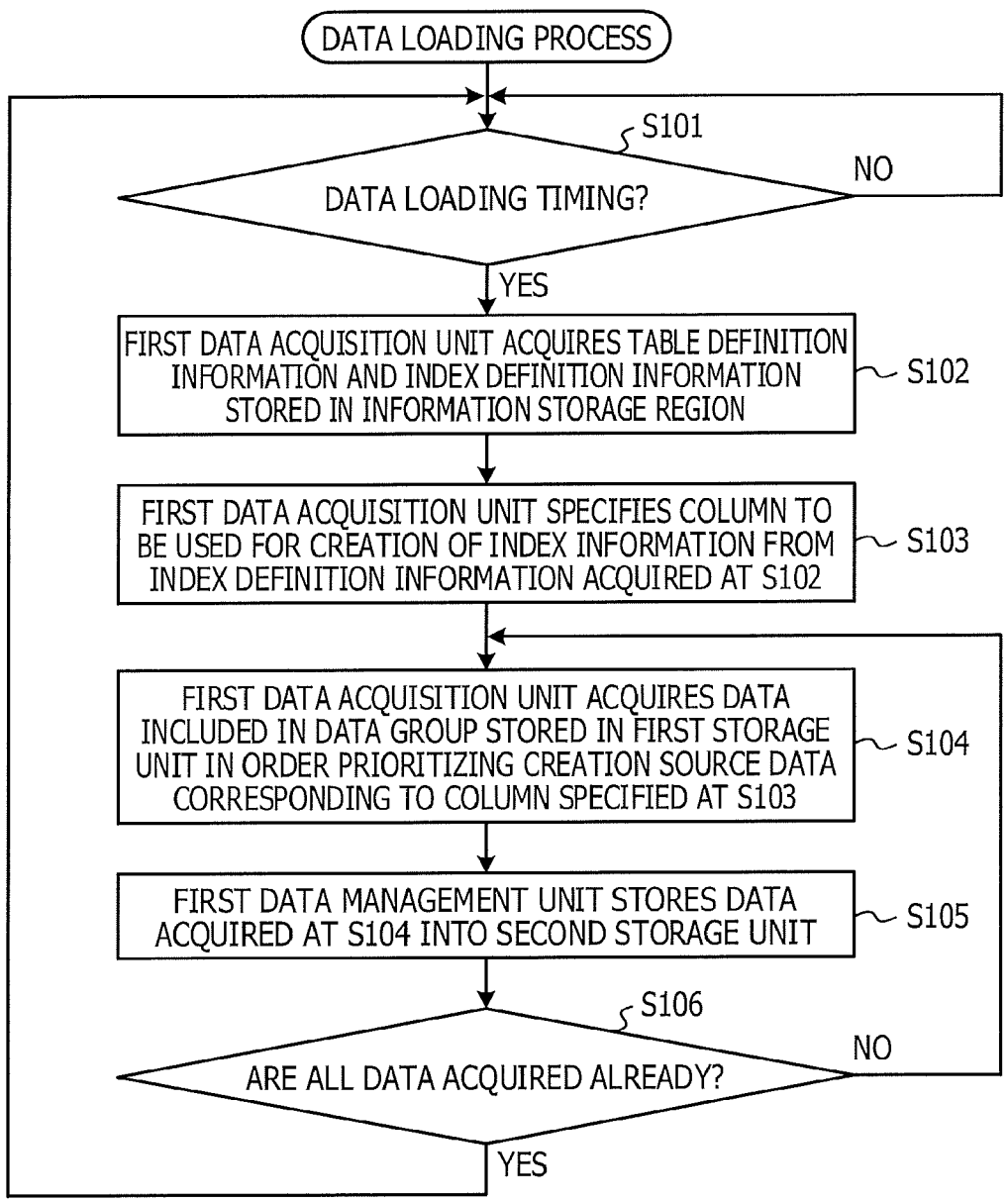
FIGS. 22 to 26 are flow charts illustrating details of a data loading process in the second embodiment.

The first data acquisition unit 111a of the first information processing apparatus 1a waits that a data loading timing comes as depicted in FIG. 22 (NO at S101). Then, when a data loading timing comes (YES at S101), the first data acquisition unit 111a acquires the table definition information 131 and the index definition information 132 stored in the information storage region 130a (S102).

Thereafter, the first data acquisition unit 111a specifies a column to be used for creation of index information IDX from the index definition information 132 acquired by the process at S102 (S103). In the following, details of the process at step S103 are described.

[Details of Process at S103]

Figure 23:
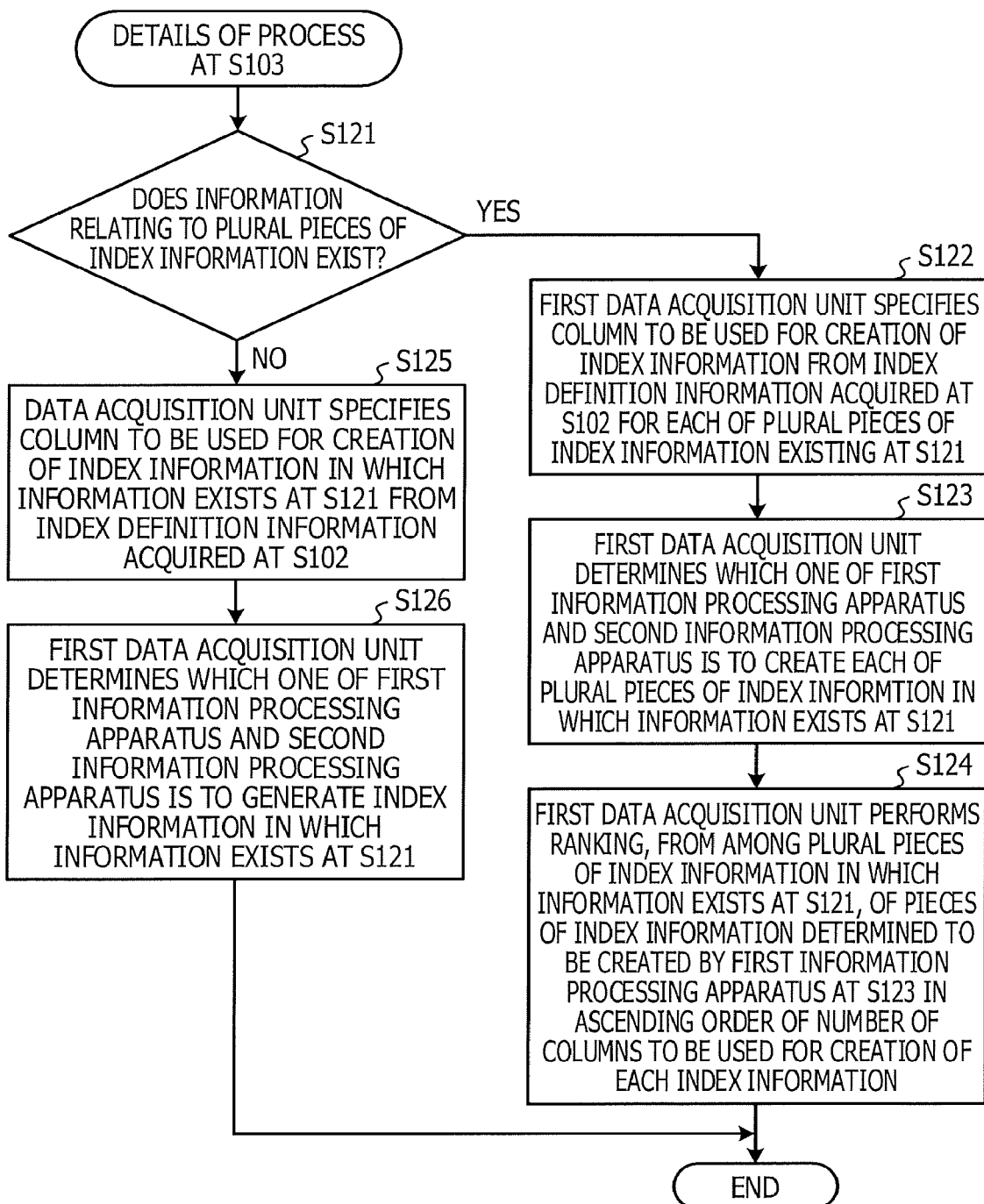

FIG. 23 is a view depicting details of the process at S103. The first data acquisition unit 111a specifies whether or not information relating to a plurality of pieces of index information IDX is included in the index definition information 132 acquired by the process at S102 (S121) as depicted in FIG. 23.

If information relating to a plurality of pieces of index information IDX is included (YES at S121), the first data acquisition unit 111a specifies a column to be used for creation of index information IDX for each of the plurality of existing pieces of index information IDX decided by the process at S121 from the index definition information 132 acquired by the process at S102 (S122).

Then, different from the first embodiment, in the second embodiment, the first data acquisition unit 111a determines which one of the first information processing apparatus 1a (first index creation unit 113a) and the second information processing apparatus 1b (second index creation unit 113b) is to create each of the plurality of pieces of index information IDX whose existence is decided by the process at S121 (S123).

For example, the first index creation unit 113a and the second index creation unit 113b in the second embodiment create, in sharing, the plurality of pieces of index information IDX whose existence is decided by the process at S121. Consequently, the first index creation unit 113a and the second index creation unit 113b may further decrease the period of time required for creation of a plurality of existing pieces of index information IDX detected by the process at S121.

For example, the first data acquisition unit 111a specifies a number of columns to be used for creation individually of a plurality of existing pieces of index information IDX detected by the process at S121 and performs ranking of each of the plurality of pieces of index information IDX such that an index with regard to which the number of specified columns is smaller has a higher rank. Then the first data acquisition unit 111a may specify, for example, a piece of index information IDX having an odd-numbered rank as the first index information IDX1 to be created by the first index creation unit 113a and specify a piece of index information IDX having an even-numbered rank as the second index information IDX2 to be created by the second index creation unit 113b. Alternatively, the first data acquisition unit 111a may specify, for example, a piece of index information IDX having an even-numbered rank as the first index information IDX1 to be created by the first index creation unit 113a and specify a piece of index information IDX having an odd-numbered rank as the second index information IDX2 to be created by the second index creation unit 113b.

It is to be noted that, where the cluster system included in the online system 10 is configured from N (N is an integer equal to or greater than 3) information processing apparatus, the first data acquisition unit 111a may specify, for example, pieces of the index information IDX that exhibit an equal remainder when the ranks thereof are divided by N as index information IDX to be created by the first information processing apparatus 1a (first index creation unit 113a). For example, where the cloud system included in the online system 10 is configured from three information processing apparatus, the first data acquisition unit 111a may specify a piece of index information IDX that indicates 0 as the remainder when the rank thereof is divided by 3, specify another piece of index information IDX that indicates 1 as the remainder when the rank thereof is divided by 3 and specify a further piece of index information IDX that indicates 2 as the remainder when the rank thereof divided by 3 as index information IDX to be created by each of three information processing apparatus.

Thereafter, the first data acquisition unit 111a performs ranking of the pieces of index information IDX included in the first index information IDX1 determined by the process at S123 from among the plurality of pieces of index information IDX with regard to which information exists by the process at S121 in an ascending order of the number of columns to be used for creation of the index information IDX (S124). For example, the first data acquisition unit 111a may use the ranks determined individually for the plurality of pieces of index information IDX by the process at S123 as they are.

On the other hand, if it is specified by the process at S121 that information relating to a plurality of pieces of index information IDX is not included (NO at S121), the first data acquisition unit 111a specifies a column to be used for creation of index information IDX (one piece of index information IDX) with regard to which existence of information is specified by the process at S121 from the index definition information 132 acquired by the process at S102 (S125). Thereafter, the first data acquisition unit 111a determines, for example, which one of the first information processing apparatus 1a (first index creation unit 113a) and the second information processing apparatus 1b (second index creation unit 113b) is used to create the index information IDX with regard to which existence of information is specified by the process at S121 (S126).

Referring back to FIG. 22, the first data acquisition unit 111a acquires data included in the target data DT1 stored in the storage apparatus 2 in order prioritizing the creation source data corresponding to the column specified by the process at S103 (S104). In the following, details of the process at S104 are described.

[Details of Process at S104]

Figure 24:
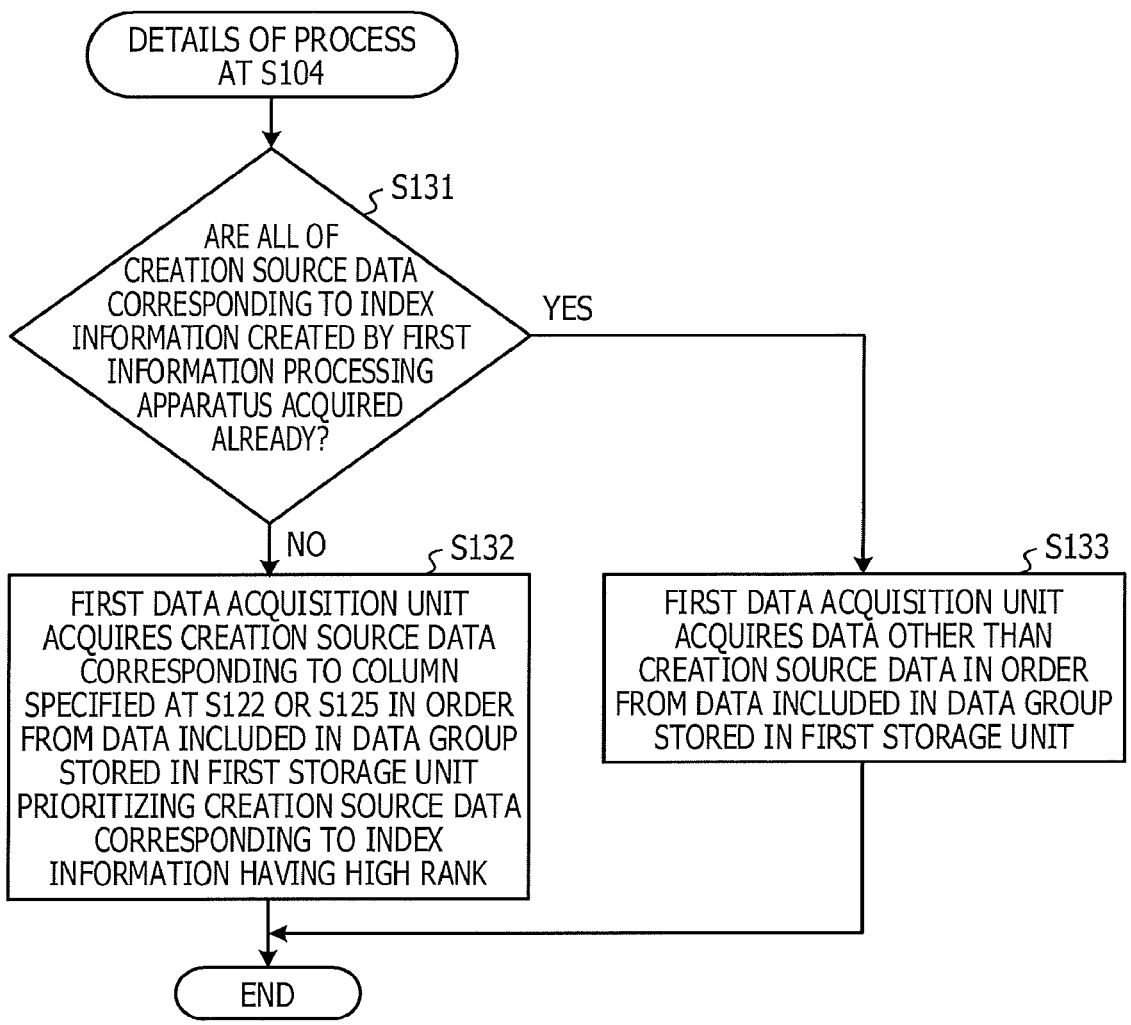

FIG. 24 is a view illustrating details of the process at S104. The first data acquisition unit 111a decides whether or not acquisition of al creation source data corresponding to the index information IDX determined to be created by the first index creation unit 113a by the process at S123 or S126 from among the data included in the target data DT1 as depicted in FIG. 24 is completed (S131).

If it is decided that acquisition of all creation source data is not completed (NO at S131), the first data acquisition unit 111a acquires creation source data corresponding to columns specified by the process at S122 or S125 from the data included in the target data DT1 stored in the storage apparatus 2 in order. For example, the first data acquisition unit 111a acquires creation source data corresponding to the columns specified by the process at S122 or S125 in order prioritizing the creation source data corresponding to index information IDX having a high priority rank (S132).

For example, the first data acquisition unit 111a preferentially performs acquisition of creation source data to be used for creation of index information included in the first index information IDX1 from among data included in the target data DT1 stored in the storage apparatus 2. Further, where the first index information IDX1 includes a plurality of pieces of index information, the first data acquisition unit 111a performs acquisition of creation source data to be used for creation of first index information IDX1 in order beginning with the creation source data corresponding to the index information having a comparatively high priority rank.

On the other hand, if it is decided by the process at S131 that acquisition of all creation source data is completed (YES at S131), the first data acquisition unit 111a acquires data other than the creation source data from among the data included in the target data DT1 stored in the storage apparatus 2 in order (S133).

Referring back to FIG. 22, the first data management unit 112a of the first information processing apparatus 1a stores the data acquired by the process at S104 into the storage apparatus 3a (S105). Thereafter, if acquisition of all data included in the target data DT1 is not completed (NO at S106), the first data acquisition unit 111a performs the processes at the steps beginning with S104 again. On the other hand, if acquisition of all data included in the target data DT1 is completed (YES at S106), the first data acquisition unit 111a waits for a next data loading timing (S101).

Figure 25:
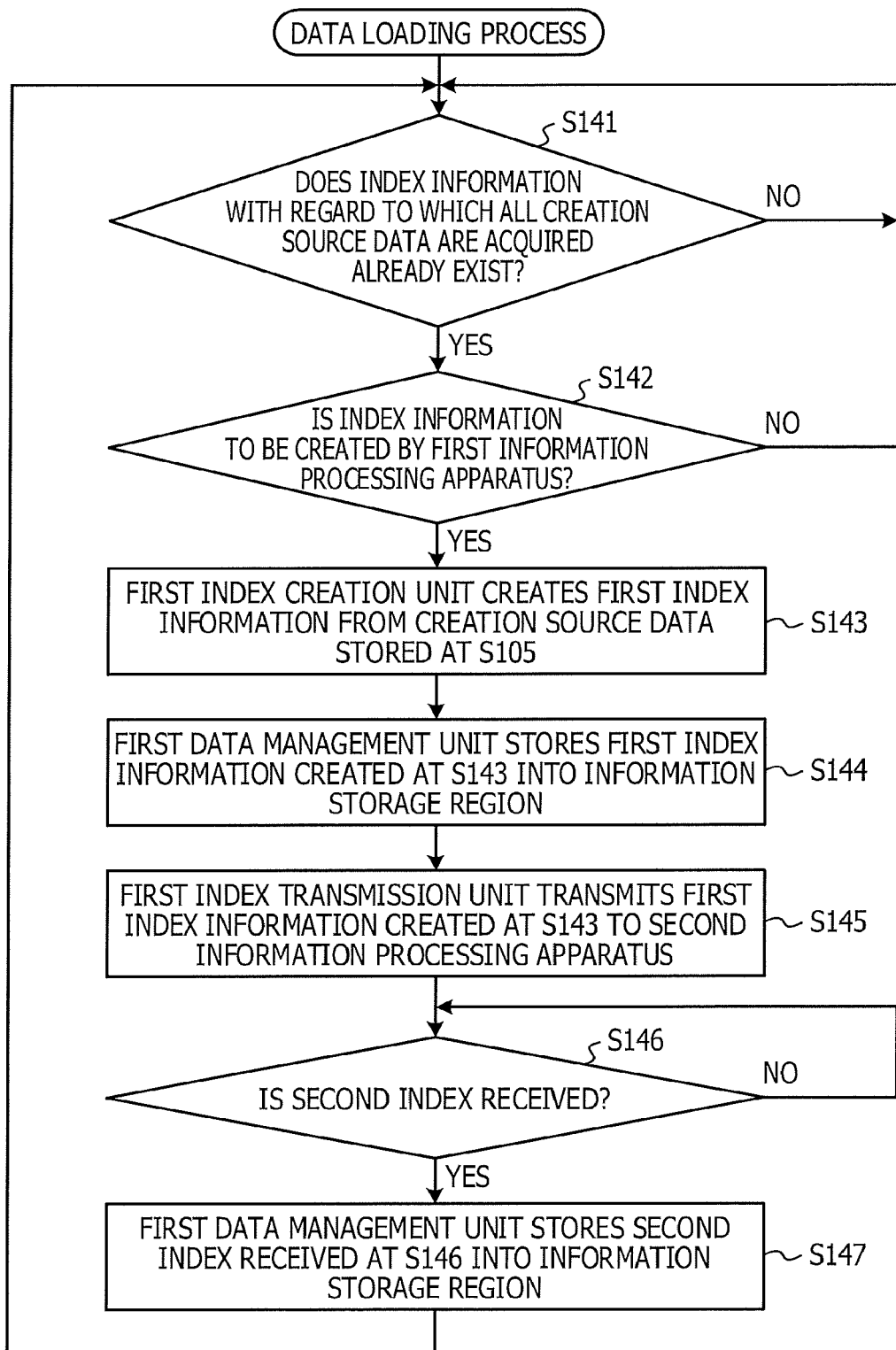

Further, the first index creation unit 113a waits that existence of index information IDX with regard to which acquisition of all creation source data to be used for creation is completed is detected as depicted in FIG. 25 (NO at S141). Then, if existence of index information IDX with regard to which acquisition of all creation source data to be used for creation is completed is detected (YES at S141), the first index creation unit 113a decides whether or not the index information IDX with regard to which existence is detected is the first index information IDX1 (S142).

If the index information IDX with regard to which existence is detected is the first index information IDX1 (YES at S142), the first index creation unit 113a creates first index information IDX1 from the creation source data stored in the storage apparatus 3a by the process at S105 (creation source data acquired by the process at S104)(S143). Then, the first data management unit 112a stores the first index information IDX1 created by the process at S143 into the information storage region 130a (S144).

Furthermore, the first index transmission unit 115a of the first information processing apparatus 1a transmits the first index information IDX1 created by the process at S143 to the second information processing apparatus 1b (S145).

Consequently, when the second data accessing unit 114b of the second information processing apparatus 1b accesses the stored data DT2b, it may refer not only to the second index information IDX2 created by the second index creation unit 113b of the second information processing apparatus 1b but also to the first index information IDX1 created by the first index creation unit 113a.

Thereafter, the first index reception unit 116a of the first information processing apparatus 1a waits that it receives the second index information IDX2 transmitted from the second information processing apparatus 1b (NO at S146). Then, if the second index information IDX2 is received (YES at S146), the first data management unit 112a stores the second index information IDX2 received by the process at S146 into the information storage region 130a (S147).

Consequently, when the first data accessing unit 114a of the first information processing apparatus 1a access the stored data DT2a, it may refer not only to the first index information IDX1 created by the first index creation unit 113a but also to the second index information IDX2 created by the second index creation unit 113b of the second information processing apparatus 1b.

Therefore, even if the first information processing apparatus 1a or the second information processing apparatus 1b is disturbed from accessing the other information processing apparatus by occurrence of an abnormal state or the like, they may continue the reference to the first index information IDX1 and the second index information IDX2.

It is to be noted that the first index reception unit 116a may access the second information processing apparatus 1b spontaneously to acquire the second index information IDX2.

On the other hand, if the index information IDX with regard to which existence is detected by the process at S141 is not the first index information IDX1 by the process at S142 (NO at S142), the first index creation unit 113a performs the process at S141 again.

[Data Accessing Process]

Figure 26:
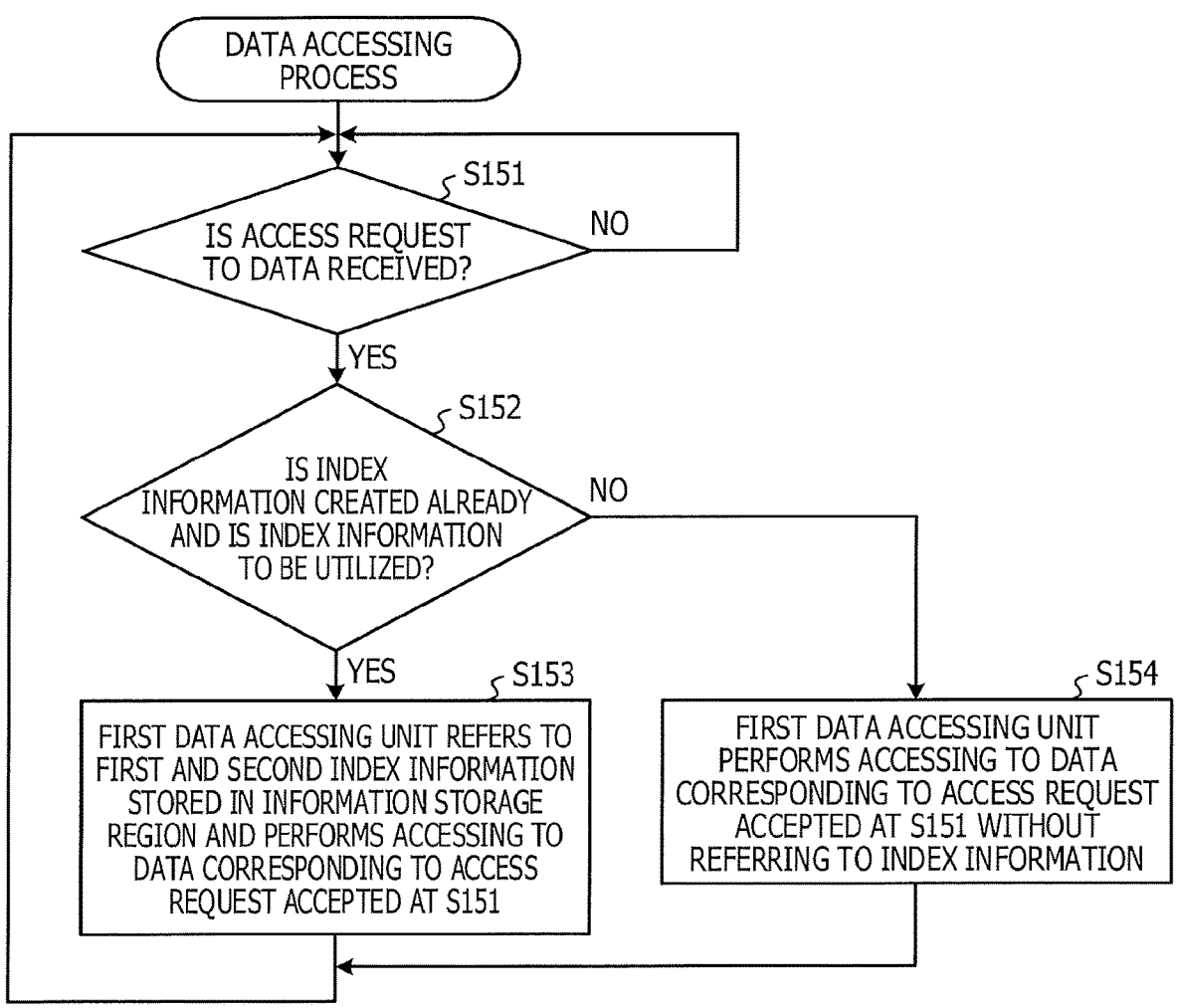

Now, the data accessing process in the second embodiment is described. FIG. 26 is a flow chart illustrating the data accessing process in the second embodiment.

As depicted in FIG. 26, the first data accessing unit 114a of the first information processing apparatus 1a waits that an access request for data included in the stored data DT2a (a reading out request or a writing request for data or the like) is accepted (NO at S151). For example, the first data accessing unit 114a waits that, for example, an access request issued by the user through an operation terminal (not depicted) is accepted.

Then, when an access request to data included in the stored data DT2a is accepted (YES at S151), then the first data accessing unit 114a refers, for example, to the information storage region 130a to decide whether or not index information IDX to data corresponding to the access request accepted by the process at S151 (first index information IDX1 or second index information IDX2) is created already (S152).

If it is decided that index information IDX to data corresponding to the access request accepted by the process at S151 is created and besides the index information IDX is to be utilized (YES at S152), the first data accessing unit 114a refers to the first index information IDX1 and the second index information IDX2 stored in the information storage region 130a to specify the storage position of the data corresponding to the access request accepted by the process at S151. Then, the first data accessing unit 114a performs accessing to the storage position specified by the process at S152 (S153). Thereafter, the first data accessing unit 114a performs outputting of a result of the accessing or the like as occasion demands.

On the other hand, if it is decided that index information IDX to data corresponding to the access request accepted by the process at S151 is not created or the index information IDX is not to be utilized (NO at S152), the first data accessing unit 114a performs accessing to the data corresponding to the access request accepted by the process at S151 without referring to index information IDX (S154). Thereafter, the first data accessing unit 114a performs outputting of a result of the accessing or the like as occasion demands.

For example, when the first data accessing unit 114a performs accessing to data included in the stored data DT2a stored in the storage apparatus 3a, it refers not only to the first index information IDX1 created by the first index creation unit 113a but also to the second index information IDX2 received from the second information processing apparatus 1b to perform data accessing.

Consequently, even if the first index creation unit 113a performs creation only of part of the index information IDX (first index information IDX1), the first data accessing unit 114a may refer to all of the index information IDX to perform data accessing.

[Particular Example of Configuration of Online System]

Figure 27:
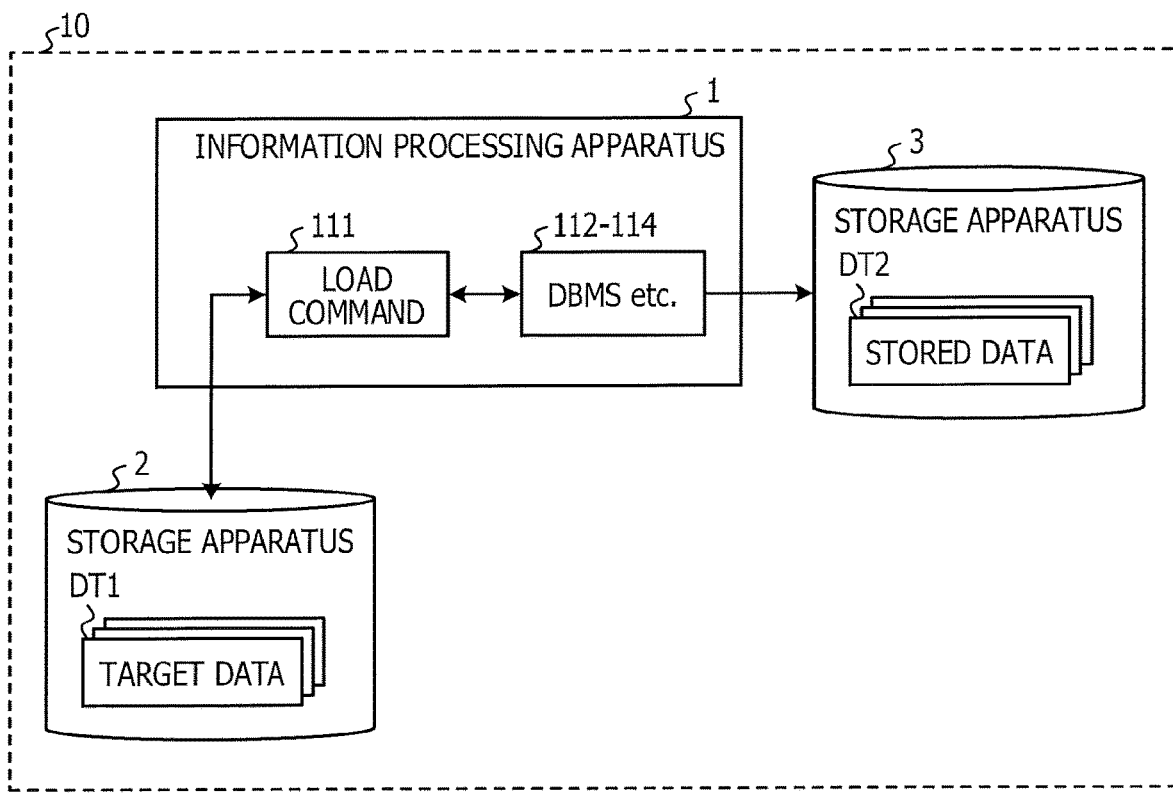
FIGS. 27 and 28 are views illustrating a particular example of a configuration of an online system in the first embodiment.
Figure 28:
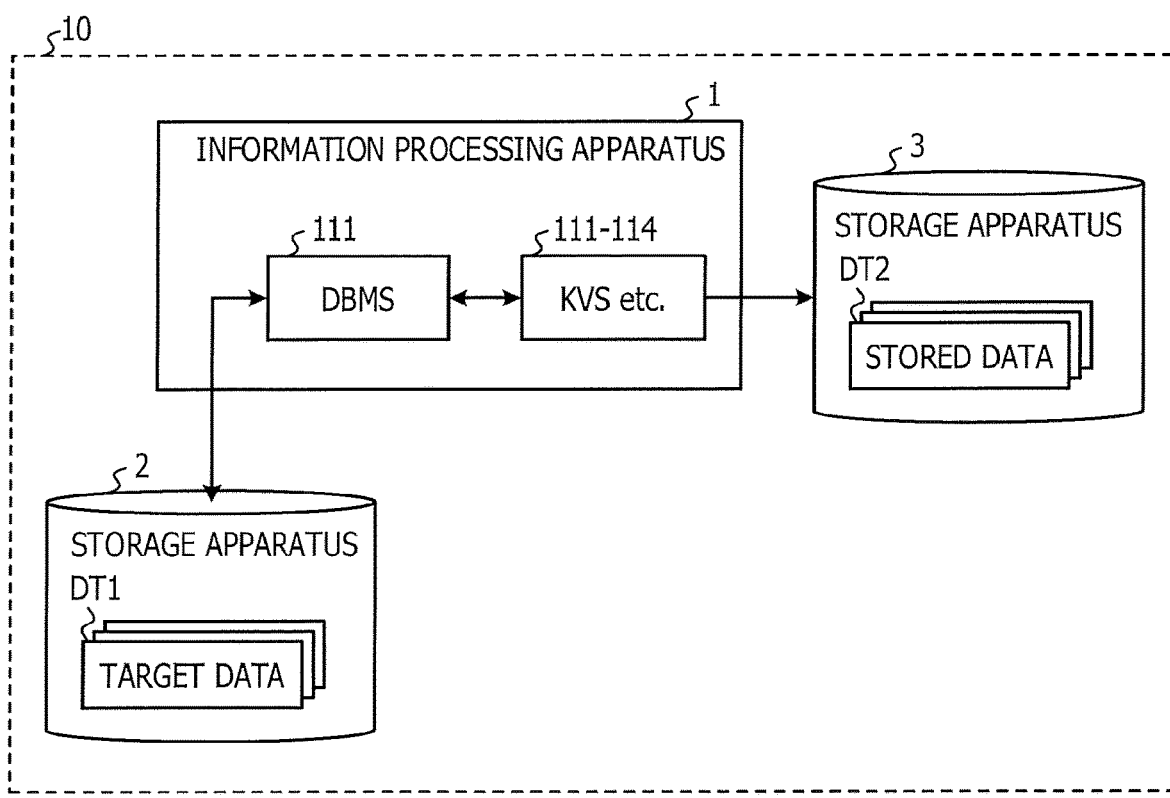
Figure 29:
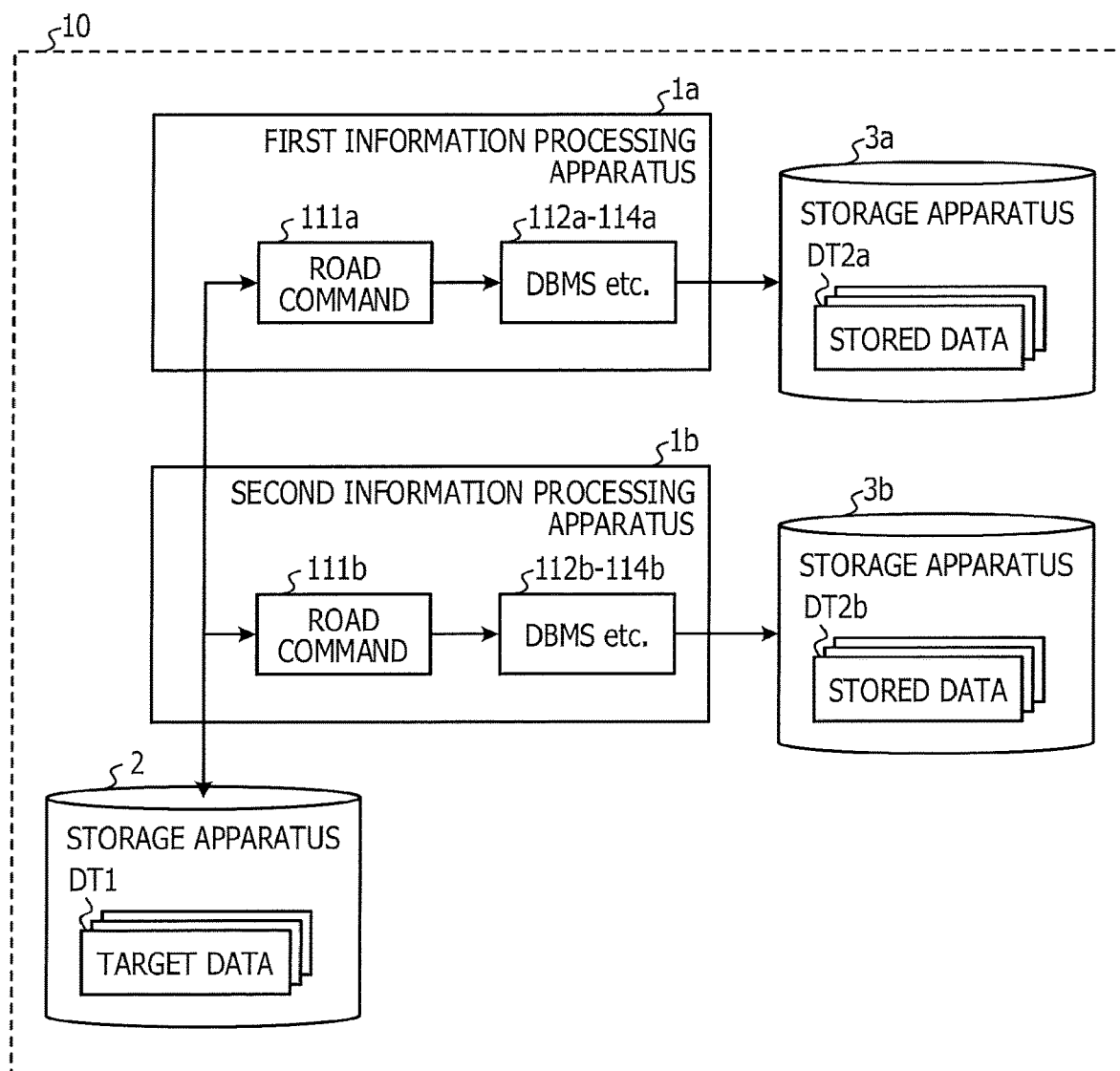
FIGS. 29 and 30 are views illustrating a particular example of a configuration of an online system in the second embodiment.
Figure 30:
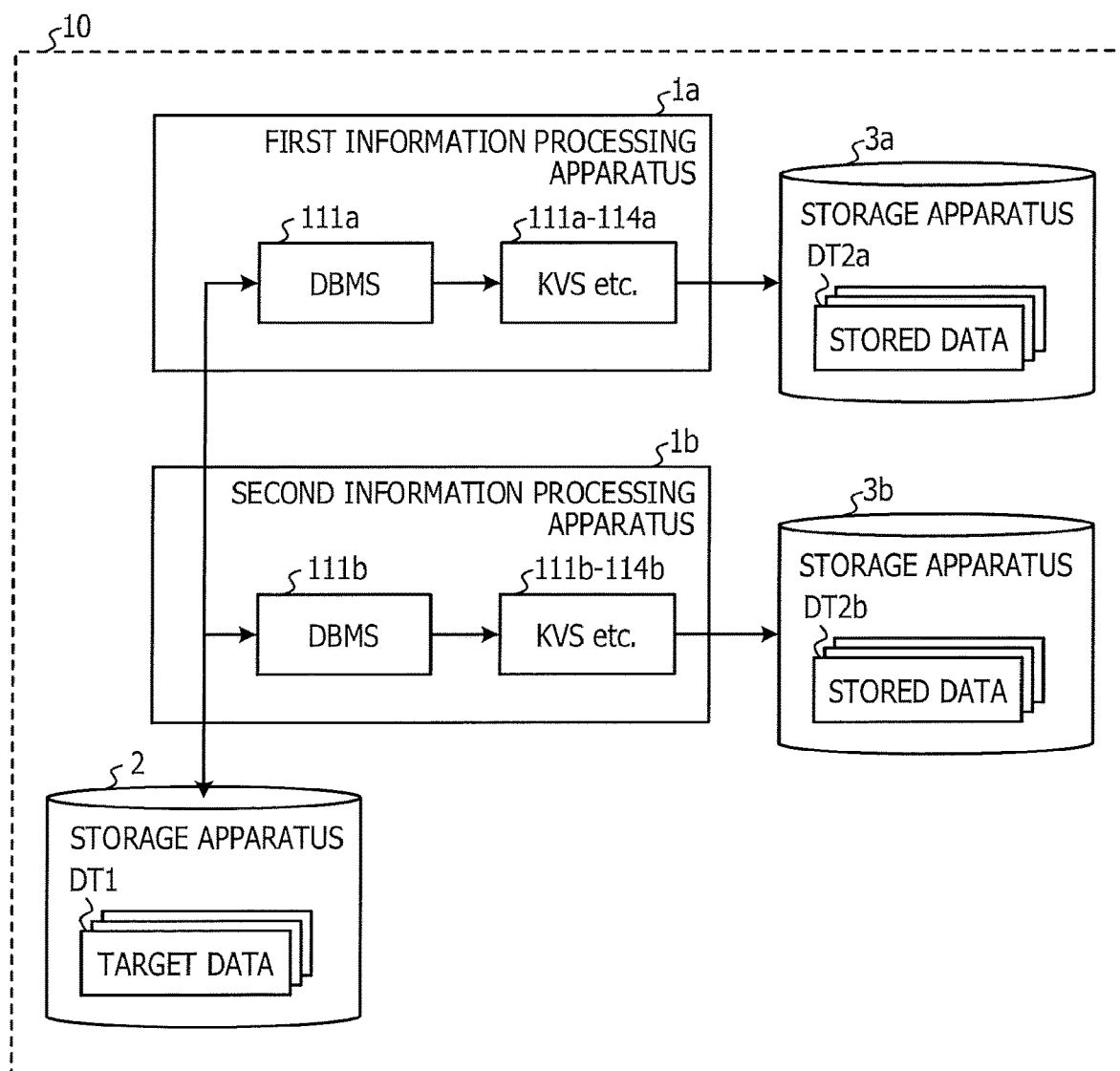

Now, a particular example of the configuration of the online system 10 is described. FIGS. 27 and 28 are views illustrating a particular example of a configuration of an online system in the first embodiment. Meanwhile, FIGS. 29 and 30 are views illustrating a particular example of a configuration of an online system in the second embodiment. It is to be noted that, in FIGS. 27 to 30, illustration of the information storage region 130a and the information storage region 130b is omitted.

The data acquisition unit 111 in the first embodiment may have a function of a load command as depicted in FIG. 27. According to the load command, for example, in response to that an input to start storage of target data DT1 into the storage apparatus 3 is accepted from a business person or the like, the target data DT1 stored in the storage apparatus 2 is acquired and then the acquire target data DT1 is transmitted to a DBMS or the like. Meanwhile, the data management unit 112, index creation unit 113 and data accessing unit 114 in the first embodiment may have functions of a DBMS or the like as depicted in FIG. 27. The DBMS or the like in this case stores, for example, in response to reception of the target data DT1 from the load command, the received target data DT1 into the storage apparatus 3.

It is to be noted that, in the example of FIG. 27, the load command, DBMS and so forth operate in the same physical machine (information processing apparatus). In contrast, the load command, DBMS and so forth may operate in physical machines different from one another. In this case, the load command may be of the type that performs acquisition of the index definition information 132 when accessing to the DBMS or the like is to be performed. Alternatively, the load command may be, for example, of the type that accepts a designation of the index definition information 132 from a business person or the like and performs acquisition of the index definition information 132 based on the accepted information.

Further, the data acquisition unit 111 in the first embodiment may have a function of a DBMS and a function of a KVS or an IMDB (hereinafter referred to as KVS or the like) as depicted in FIG. 28. In this case, the DBMS acquires the target data DT1 stored in the storage apparatus 2, for example, in response to acceptance of an acquisition request for data from the KVS or the like and transmits the acquired target data DT1 to the KVS or the like. Alternatively, the data management unit 112, index creation unit 113 and data accessing unit 114 in the first embodiment may have a function of the KVS or the like as depicted in FIG. 28. In this case, the KVS or the like stores, in response to that target data DT1 is received from the DBMS, the received target data DT1 into the storage apparatus 3.

It is to be noted that, in the example depicted in FIG. 28, the DBMS, KVS and so forth operate in the same physical machine (information processing apparatus). However, the DBMS, KVS and so forth may individually operate in physical machines different from one another. In this case, for example, the KVS or the like may be of the type that acquires the index definition information 132, for example, by a structured query language (SQL). Alternatively, in this case, the KVS or the like may be of the type, for example, that accepts a designation of the index definition information 132 from the business person or the like and perform acquisition of the index definition information 132 based on the accepted information.

Meanwhile, the first data acquisition unit 111a in the second embodiment may have a function of a load command as depicted in FIG. 29. Meanwhile, the first data management unit 112a, first index creation unit 113a and first data accessing unit 114a in the second embodiment may have a function of a DBMS or the like as depicted in FIG. 29. Similarly, the second data acquisition unit 111b in the second embodiment may have a function of a load command as depicted in FIG. 29. Further, the second data management unit 112b, second index creation unit 113b and second data accessing unit 114b in the second embodiment may have a function of a DBMS or the like as depicted in FIG. 29.

Furthermore, the first data acquisition unit 111a in the second embodiment may have a function of a DBMS and a function of a KVS or the like as depicted in FIG. 30. Further, the first data management unit 112a, first index creation unit 113a and first data accessing unit 114a in the second embodiment may have a function of a KVS or the like as depicted in FIG. 30. Similarly, the second data acquisition unit 111b in the second embodiment may have a function of a DBMS and a function of a KVS or the like as depicted in FIG. 30. Further, the second data management unit 112b, second index creation unit 113b and second data accessing unit 114b in the second embodiment may have a function of a KVS or the like as depicted in FIG. 30.

All examples and conditional language recited herein are intended for pedagogical purposes to and the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for data loading comprising:
a memory; and
a processor coupled to the memory and the processor configured to:
execute first acquisition of first data corresponding to a first column from a data group stored in a first storage, a data structure of the data group including columns and rows;
store the first data into a second storage;
generate a first index, based on the first data and for searching the data group to be stored in the second storage, in response to the first acquisition and before storing the data group into the second storage; and
store the data group in the second storage.

2. The apparatus according to claim 1, wherein the processor is further configured to:
acquire, for each column, other data corresponding to another column from the data group stored in the first storage; and
store, for each column, the other data into the second storage.

3. The apparatus according to claim 1, wherein the processor is further configured to, prior to the first acquisition, specify the first column by referring identification information indicating one or more columns to be used for creation of indexes.

4. The apparatus according to claim 3, wherein
the processor is further configured to, in a case that the identification information indicates a first column group to be used for creation of the first index and a second column group to be used for creation of a second index, compare a first number of columns included in the first column group with a second number of columns included in the second column group,
in a case that the first number is fewer than the second number, the first acquisition is executed prior to a second acquisition of second data corresponding to the second column group, and
in a case that the second number is fewer than the first number, the second acquisition is executed prior to the first acquisition.

5. The apparatus according to claim 1, wherein the processor is further configured to transmit the first index to another apparatus that stores the data group stored in a first storage into a third storage.

6. The apparatus according to claim 5, wherein the processor is further configured to receive a second index from the other apparatus, the second index being generated based on second data corresponding to a second column included in the data group stored in the first storage.

7. The apparatus according to claim 6, wherein the processor is further configured to:
in a case that an access request for data included in the data group stored in the second storage is accepted, specify a storage position of the data corresponding to the access request in accordance with a plurality of indexes including the first index and the second index; and
perform accessing to the specified storage position.

8. The apparatus according to claim 1, wherein
the processor is further configured to:
in a case that identification information indicates a plurality of column groups to be used for creation of indexes, specify each number of columns included in each of the plurality of column groups;
rank the plurality of column groups so that an column group whose the number of columns is comparatively small has a comparatively high rank;
specify first column groups from among the plurality of column groups, each of the first column groups being associated with an equal remainder in a case that each rank order of the column groups is divided by a total number of the information processing apparatus and other apparatuses which store the data group stored in a first storage into other storages;

acquire, for each column included in the first column groups, other data corresponding to other columns included in the first column groups from the data group stored in the first storage; and generate other indexes based on the other data, and the first column is included in one of the first column groups.

9. A data loading method executed by computer, the data loading method comprising:

executing first acquisition of first data corresponding to a first column from a data group stored in a first storage, a data structure of the data group including columns and rows;

storing the first data into a second storage;

generating a first index, based on the first data and for searching the data group to be stored in the second storage, in response to the first acquisition and before storing the data group into the second storage; and storing the data group in the second storage.

10. The data loading method according to claim 9, further comprising:

acquiring, for each column, other data corresponding to another column from the data group stored in the first storage; and storing, for each column, the other data into the second storage.

11. The data loading method according to claim 9, further comprising:

prior to the first acquisition, specifying the first column by referring identification information indicating one or more columns to be used for creation of indexes.

12. The data loading method according to claim 11, further comprising:

in a case that the identification information indicates a first column group to be used for creation of the first index and a second column group to be used for creation of a second index, comparing a first number of columns included in the first column group with a second number of columns included in the second column group, wherein in a case that the first number is fewer than the second number, the first acquisition is executed prior to a second acquisition of second data corresponding to the second column group, and in a case that the second number is fewer than the first number, the second acquisition is executed prior to the first acquisition.

13. The data loading method according to claim 9, further comprising:

transmitting the first index to another apparatus that stores the data group stored in a first storage into a third storage.

14. The data loading method according to claim 13, further comprising:

receiving a second index from the other apparatus, the second index being generated based on second data corresponding to a second column included in the data group stored in the first storage.

15. The data loading method according to claim 14, further comprising:

in a case that an access request for data included in the data group stored in the second storage is accepted, specifying a storage position of the data corresponding to the access request in accordance with a plurality of indexes including the first index and the second index; and performing accessing to the specified storage position.

16. A non-transitory computer-readable medium storing a data loading program that causes a computer to execute a process comprising:

executing first acquisition of first data corresponding to a first column from a data group stored in a first storage, a data structure of the data group including columns and rows;

storing the first data into a second storage;

generating a first index, based on the first data and for searching the data group to be stored in the second storage, in response to the first acquisition and before storing the data group into the second storage; and storing the data group in the second storage.

* * * * *